(12) United States Patent  
Cratty

(10) Patent No.: US 6,559,559 B2
(45) Date of Patent: May 6, 2003

(54) POWER SYSTEM UTILIZING A DC BUS

(75) Inventor: William E. Cratty, Bethel, CT (US)

(73) Assignee: Sure Power Corporation, Danbury, CT (US)

( * ) Notice: Subject to any disclaimer, the term of this patent is extended or adjusted under 35 U.S.C. 154(b) by 0 days.

(21) Appl. No.: 09/870,897

(22) Filed: May 31, 2001

(65) Prior Publication Data

US 2002/0014802 A1 Feb. 7, 2002

Related U.S. Application Data

(60) Provisional application No. 60/253,285, filed on Nov. 27, 2000, provisional application No. 60/210,993, filed on Jun. 12, 2000, and provisional application No. 60/208,120, filed on May 31, 2000.

(51) Int. Cl.[7] .............................. H02J 7/00; H02M 1/20
(52) U.S. Cl. ............................. 307/64; 307/67; 363/102
(58) Field of Search ........................ 323/205, 207–210; 363/102, 103, 150, 152; 307/37, 64, 67, 68, 75, 82; 702/60, 62, 65

(56) References Cited

U.S. PATENT DOCUMENTS

| | | | |
|---|---|---|---|
| 4,719,560 A | | 1/1988 | Ford ........................... 363/150 |
| 5,646,458 A | * | 7/1997 | Bowyer et al. ................ 307/67 |
| 5,767,591 A | | 6/1998 | Pinkerton ..................... 307/64 |
| 6,011,324 A | * | 1/2000 | Kohlstruck et al. ........... 307/64 |
| 6,160,722 A | | 12/2000 | Thommes et al. ............ 363/37 |
| 6,219,623 B1 | | 4/2001 | Wills ........................... 702/60 |
| 6,288,456 B1 | * | 9/2001 | Cratty .......................... 307/64 |

* cited by examiner

*Primary Examiner*—Matthew Nguyen
(74) *Attorney, Agent, or Firm*—Cantor Colburn LLP

(57) ABSTRACT

An exemplary embodiment of the invention is a power system including a first power source, a first DC bus coupled to the first power source and a second DC bus coupled to the first power source. A power conditioning device is coupled to the first DC bus and the second DC bus. A load receives power from the power conditioning device.

36 Claims, 33 Drawing Sheets

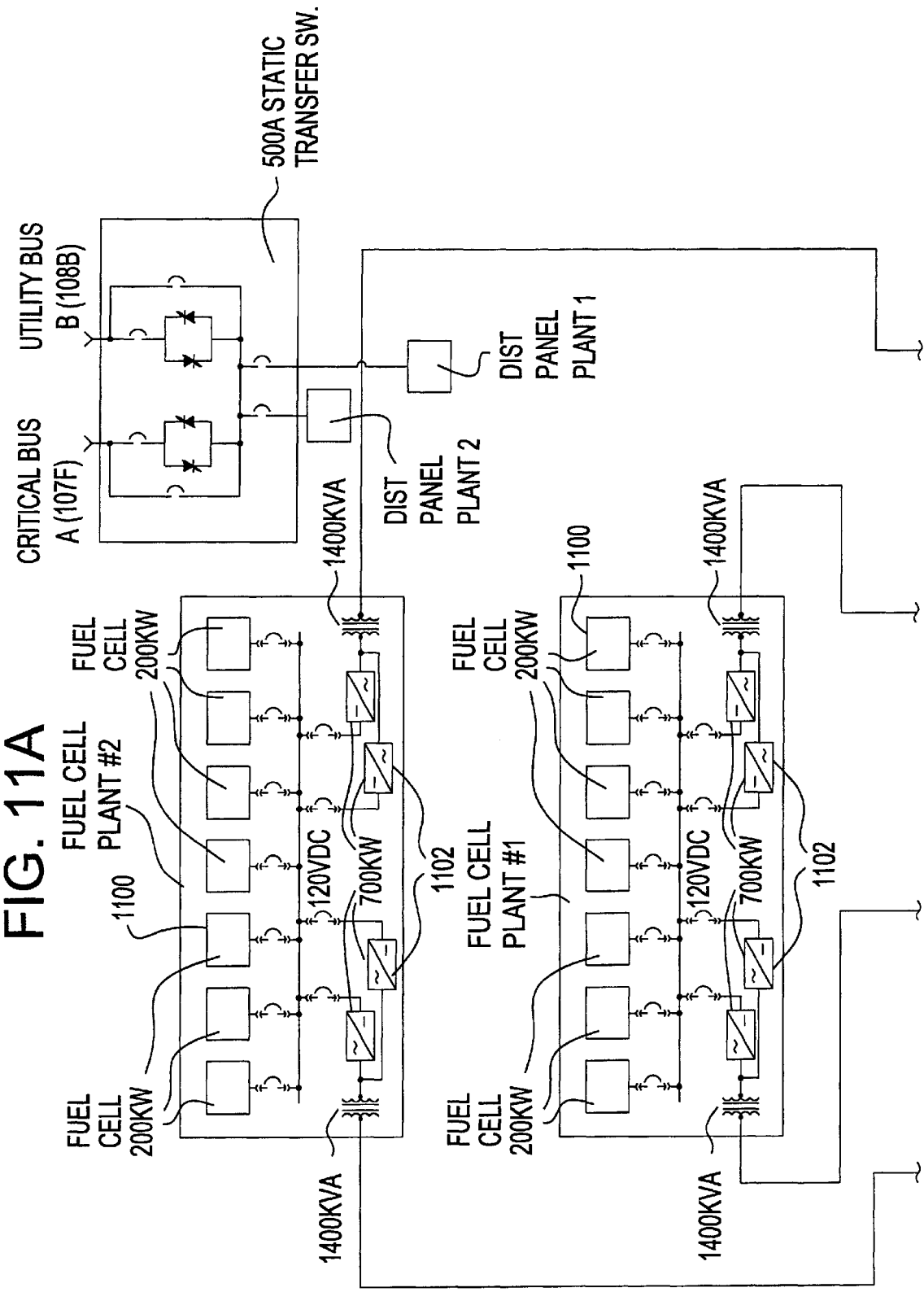

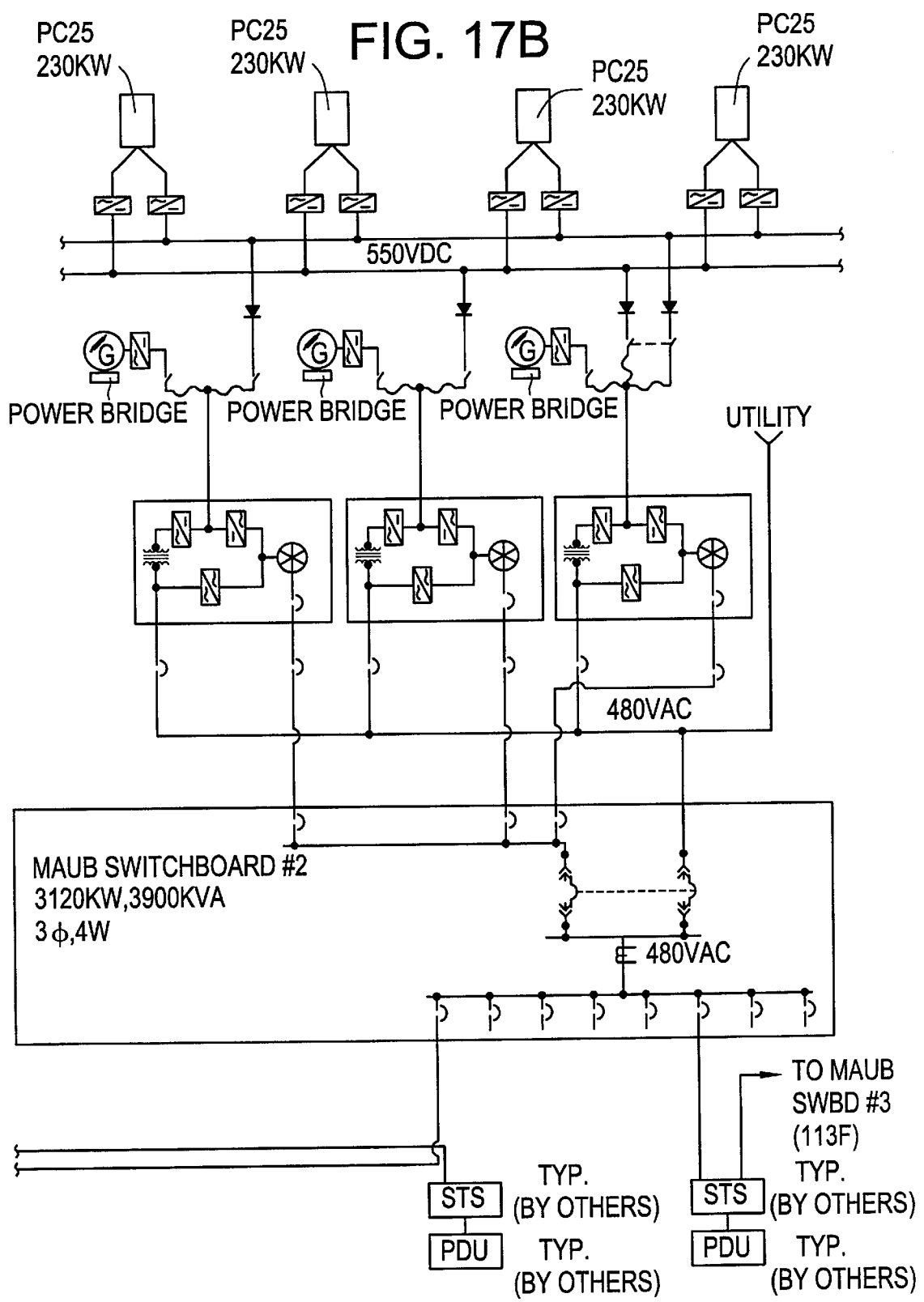

POWER SYSTEM UTILIZING A DC BUS

CROSS-REFERENCE TO RELATED APPLICATIONS

This application claims the benefit of U.S. provisional application No. 60/253,285, filed Nov. 27, 2000, the entire contents of which are incorporated herein by reference, and claims the benefit of U.S. provisional application No. 60/210,993, filed Jun. 12, 2000, the entire contents of which are incorporated herein by reference, and claims the benefit of U.S. provisional application No. 60/208,120, filed May 31, 2000, the entire contents of which are incorporated herein by reference.

BACKGROUND OF THE INVENTION

The invention relates in general to power systems and in particular to a power system incorporating redundant, auxiliary power sources to provide high reliability power to critical loads. Electronic data processing (EDP) is an increasingly important part of current business operations. Computers are used in all aspects of modern business including conducting transactions, controlling production and maintaining data. If the computers are rendered inoperative, it can cost certain businesses on the order of millions of dollars per minute.

A known cause of computer failure is an interruption in the computer power source. Computers used for EDP are sensitive to power interruptions and even a brief interruption or fault can cause the computer to malfunction. FIG. 1 is a graph of a Computer Business Equipment Manufacturers Association (CBEMA) curve, which has been adopted by the Institute of Electrical and Electronics Engineers (IEEE) as Standard 446-1987, indicating that a computer can tolerate a one half cycle or 8.3 ms power interruption. Power available from existing utility grids (industrial power) cannot meet the high power reliability requirement of modern computer equipment. A business operating and relying upon electronic data processing equipment cannot rely on industrial power given the numerous and lengthy interruptions. Accordingly, high quality power systems are required.

SUMMARY OF THE INVENTION

An exemplary embodiment of the invention is a power system including a first power source, a first DC bus coupled to the first power source and a second DC bus coupled to the first power source. A power conditioning device is coupled to the first DC bus and the second DC bus. A load receives power from the power conditioning device.

BRIEF DESCRIPTION OF THE DRAWINGS

Referring now to the drawings wherein like elements are numbered alike in the several FIGURES:

FIGS. 11A–11B are a block diagram of a power system in another embodiment of the invention;

FIGS. 17A–17D are a block diagram of a power system in another embodiment of the invention; and, FIGS. 18A, 18B–22 are block diagrams of power systems in alternate embodiments of the invention.

DESCRIPTION OF THE PREFERRED EMBODIMENTS

Figure 1:
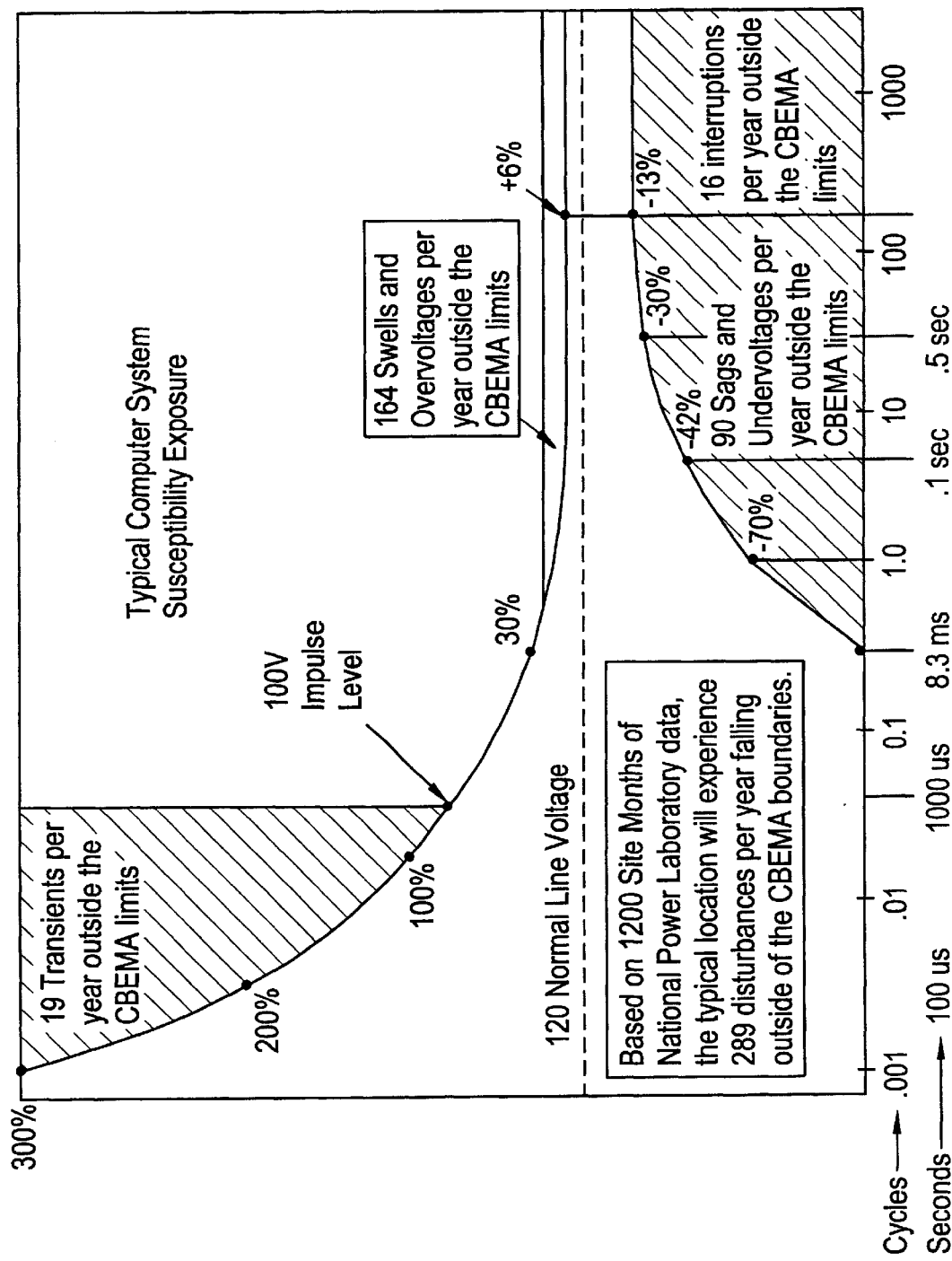
FIG. 1 is a graph illustrating the power reliability demand of modern computer equipment.
Figure 2A:
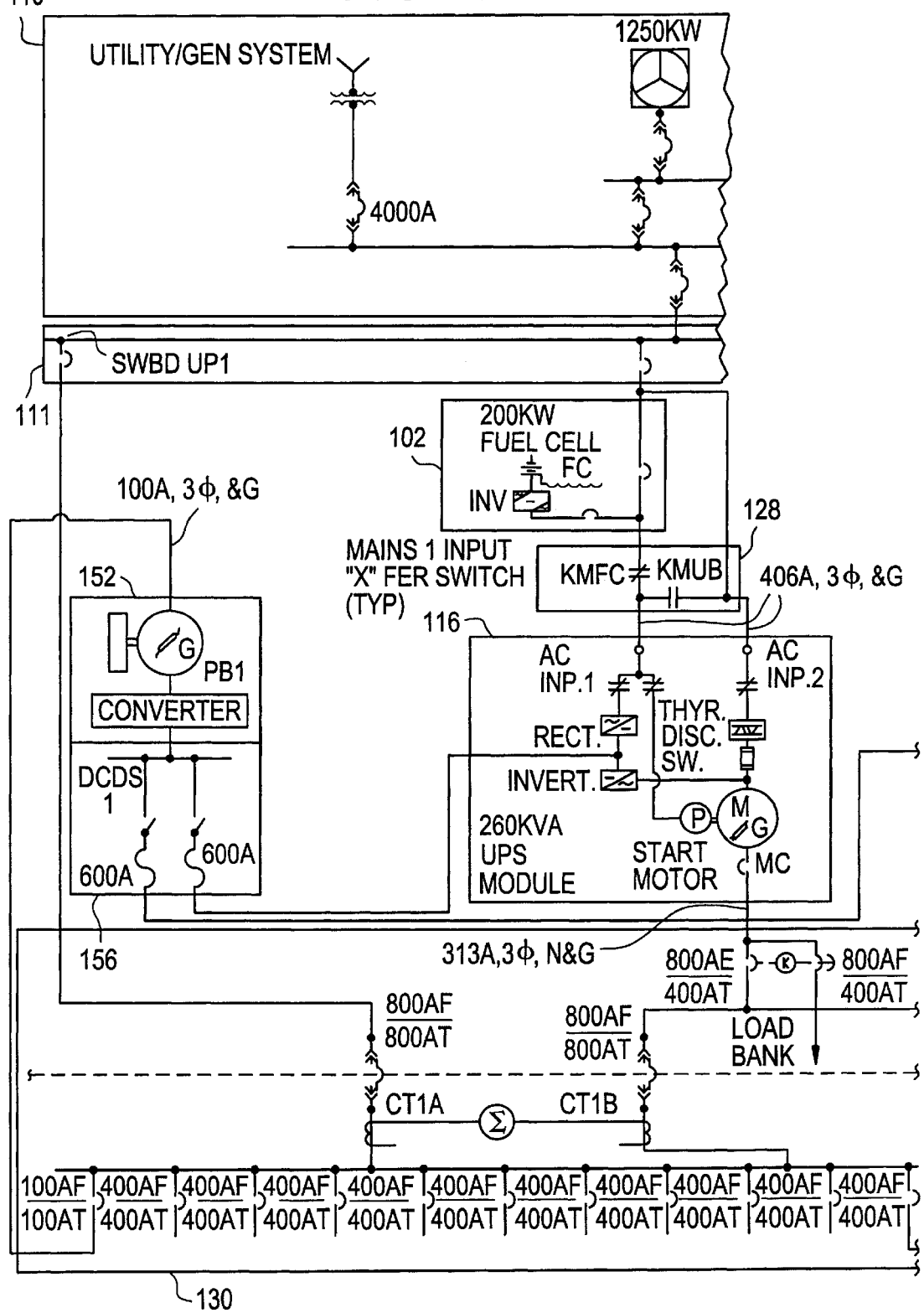
FIGS. 2A–2C are a block diagram of a power system including components of the present invention.
Figure 2B:
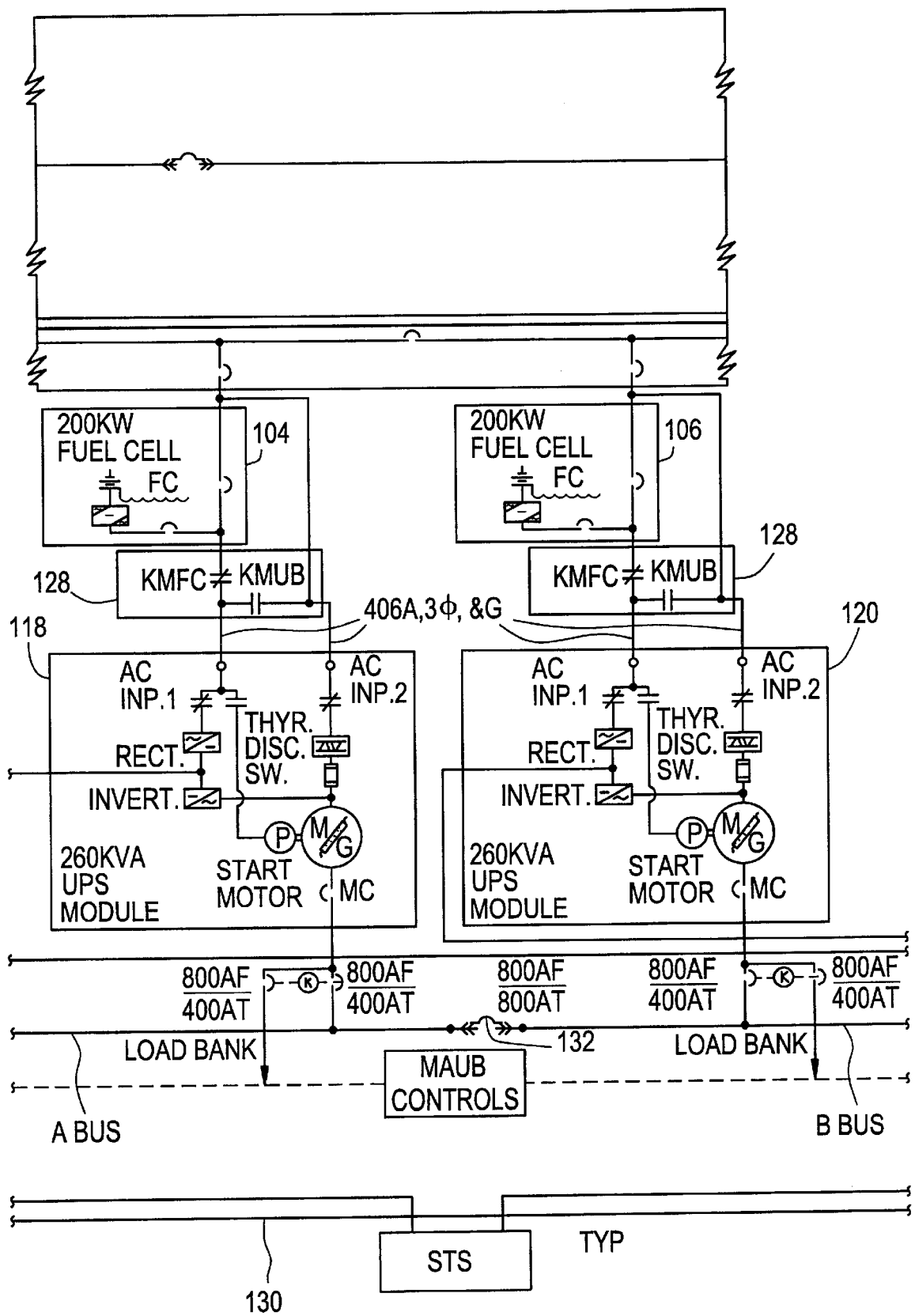
Figure 2C:
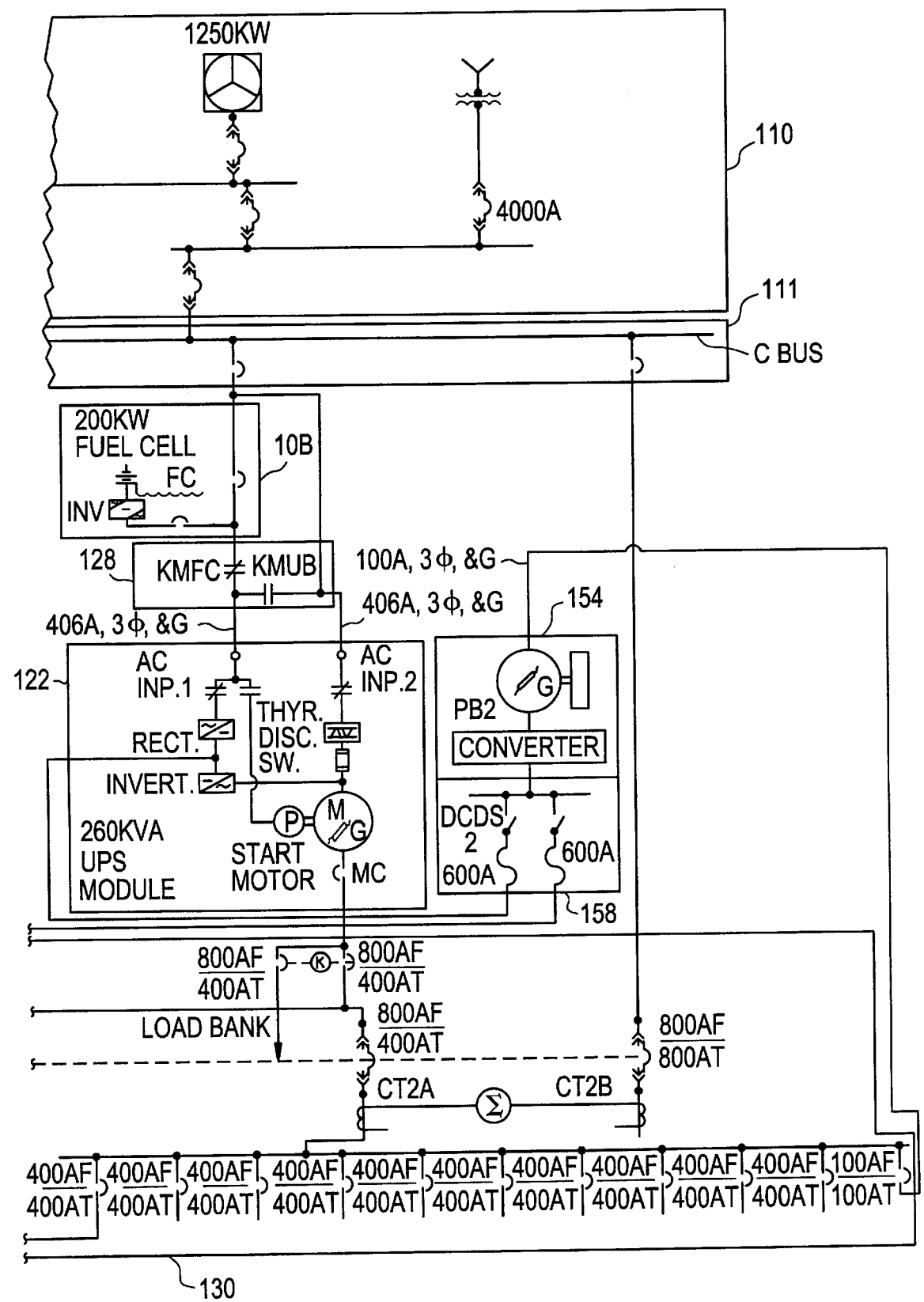

FIGS. 2A–2C are a block diagram of a power system in an exemplary embodiment of the invention. Components of the invention are described with reference to FIGS. 2A–2C but it is understood that FIGS. 2A–2C are only an exemplary configuration. The system utilizes redundant sources of power in the form of power sources 102, 104, 106 and 108 and a secondary power system 110. The secondary power system 110 may include alternate power sources such as utility lines, generators, batteries, etc. The secondary power system 110 may also include fuel cells. The secondary power system 110 feeds a switchboard 111 or C bus. Power sources 102, 104, 106 and 108 may be fuel cells such as the PC25 available from Onsi Corporation. Although FIGS. 2A–2C depict fuel cells as the power sources 102, 104, 106 and 108, it is understood that other power sources may be used and the invention is not limited to fuel cells. An advantage, however, of using fuel cells is that the fuel cells produce heat as a by product which can be used by the consumer to defray other costs. The embodiment shown in FIGS. 2A–2C is designed for use with a critical load requirement of 350 kw. Fuel cells 102 and 104 can supply the entire critical load through a first or A bus. Fuel cells 106 and 108 supply power to a second or B bus which can also supply the entire critical load if necessary (i.e., if the A bus is inoperative).

The C bus interfaces with the A bus and B bus such that the C bus serves as an additional level of backup to the A bus and B bus. The C bus may supply A bus and B bus loads through a number of methods depending on customer wants and needs. These methods include but are not limited to (1) direct connection to the second or third source pole of an A bus or B bus automatic transfer switch or rotary device, (2) direct connection to the second or third source pole of an automatic transfer switch provided by the customer in proximity to the load, (3) through the second source pole of an A bus automatic transfer switch or rotary device via the output of an automatic transfer switch which has the B bus as its preferred source and the C bus as its second source, (4) through the second or third source pole of an A bus automatic transfer switch or rotary device via the output of an automatic transfer switch which has two or more utilities or other power sources as its input, and (5) automatic by pass directly to the A bus or B bus.

The system further comprises four rotary devices in the form of un-interruptible power systems (UPS) 116, 118, 120 and 122. A suitable UPS is the Uniblock-il brand sold by Piller. Each UPS includes a motor-generator to provide AC power to the critical load 114. Each UPS includes two inputs labeled AC input 1 and AC input 2. A transfer switch 128 is used to control the flow of power between a power source (e.g., 102), the utility/generator system 110 and the rotary device 116. Power flow during multiple modes of operation is described herein with reference to FIG. 3.

Due to the nature of the fuel cell to disconnect upon detection of power faults, rotary devices are used to stabilize fluctuations, clear faults and prevent the fuel cells from disconnecting. It is important to note that UPS's are not the only type of rotary devices that can be used to enhance voltage stability. Unlike rotating machines, commercially available fuel cell power modules have no inertia and current flow stops almost immediately after a control action takes place limited only by inductive storage in the output magnetics. To overcome this shortcoming, the system includes rotary devices. A rotary device is any rotary UPS, motor generator, motor, synchronous condenser, flywheel, or other device that can provide inertia for storing and discharging real or reactive power. During operation, power ebbs and flows from the rotary devices in coordination with power demand and power supply to stabilize system voltage.

Additional rotary devices may be used to provide power during certain conditions. As shown in FIGS. 2A–2C, a rotary device 152 is connected to UPS 116 and UPS 118 through switch 156. Rotary device 154 is connected to UPS 120 and UPS 122 through switch 158. In an exemplary embodiment, rotary devices 152 and 154 are flywheels such as the Powerbridge flywheel sold by Piller. Flywheels 152 and 154 are shown connected to AC input 1 but may also be connected to AC input 2. It is understood that a variety of rotary devices may be used. The number of flywheels or rotary devices can vary from one rotary device for all the UPS's to one rotary device per UPS. It is preferable to have at least two flywheels so that there is some redundancy in this component of the system. Additional flywheels may be necessary depending on the load requirements and the desired level of redundancy. Devices other than flywheels may be used to provide supplemental power to the UPS (e.g., generators, batteries, etc.).

As described in detail with reference to FIG. 3, the flywheels 152 and 154 provide DC power to an inverter located with each UPS in certain situations. The fuel cells 102, 104, 106 and 108 operate to disconnect from the C bus upon the detection of power faults on the C bus. When the fuel cell disconnects and enters the idle mode, the flywheel provides power so that there is no disturbance in the power to the UPS. When the fuel cell powers back up, the flywheel is used to provide a smooth load transition back on to the fuel cell. The UPS is programmed to transfer the load from the flywheel to the fuel cell gradually so that the fuel cell does not experience a step load and disconnect from the UPS. In addition, should a periodic load, such as a compressor, turn on, this could create a step load on the fuel cell causing the fuel cell to disconnect. In this situation, the flywheel is used to provide the extra power to the UPS thereby preventing the fuel cell from disconnecting. In short, the flywheel is used to provide additional short term power to provide smooth operation of the system.

The output of each UPS is fed to a paralleling switch board 130 where power from UPS 116 and UPS 118 is joined in parallel on an A bus and power from UPS 120 and UPS. 122 is joined in parallel on a B bus. The system may include tie breakers which are electro mechanical breaker devices that allow two separate buses to be connected together for the purpose of sharing a load between the buses or for powering two or more buses normally powered by separate power sources if one of the sources fails. Tie breakers may be included on the input side of rotary devices to provide the option to power a rotary device from either one of two separate power sources. Tie breakers are included on the output side of the rotary devices and automatic transfer switches to allow one power source to power loads normally powered by separate sources from a single source if one of the sources fails. As shown in FIGS. 2A–2C, tie breaker 132 can connect the A bus to the B bus. From the parallel switch board 130, power flows to the critical loads.

Transfer switches used in the system may be electromechanical or static transfer switches. Static transfer switches typically contain silicon controlled rectifiers ("SCR"). The system may include measures to protect the automatic static transfer switch SCR from damaging current flow. The SCR included in the switching mechanism in commercially available automatic static transfer switches is frail compared to the switching mechanism in electro mechanical transfer switches. Fault current flowing through an automatic static transfer switch can be of such magnitude that the SCR will "burn-up" or otherwise be destroyed. An automatic static transfer switch with a damaged SCR can not function to transfer the load between or among its sources as intended by system design. The system may incorporate current limiting devices such as fuses and reactors at appropriate locations to prevent fault current that may flow through an automatic static transfer switch from reaching a level that may damage the SCR. Rotary devices may also be located downstream of the automatic static transfer switch to prevent fault current from flowing through the switch when appropriate to system design.

The system may include a monitor/manager to locally and remotely monitor conditions and performance, command system functions, change operating parameters, archive events, perform system diagnostics, and set and broadcast alarms. The monitor/manager provides two way communications between the system operator and the controllers for the fuel cell power modules, automatic static transfer switches, and rotary devices. The system operator locally or remotely via the monitor/manager can command changes to the operating parameters of the fuel cell power modules, automatic static transfer switches and rotary devices. The monitor/manager through programming logic also can command such changes automatically. The system control scheme is such that failure of the monitor/manager will not disrupt power flow to the critical loads. The monitor/ manager provides a "viewing window" for the customer to monitor operation of the system.

Figure 3:
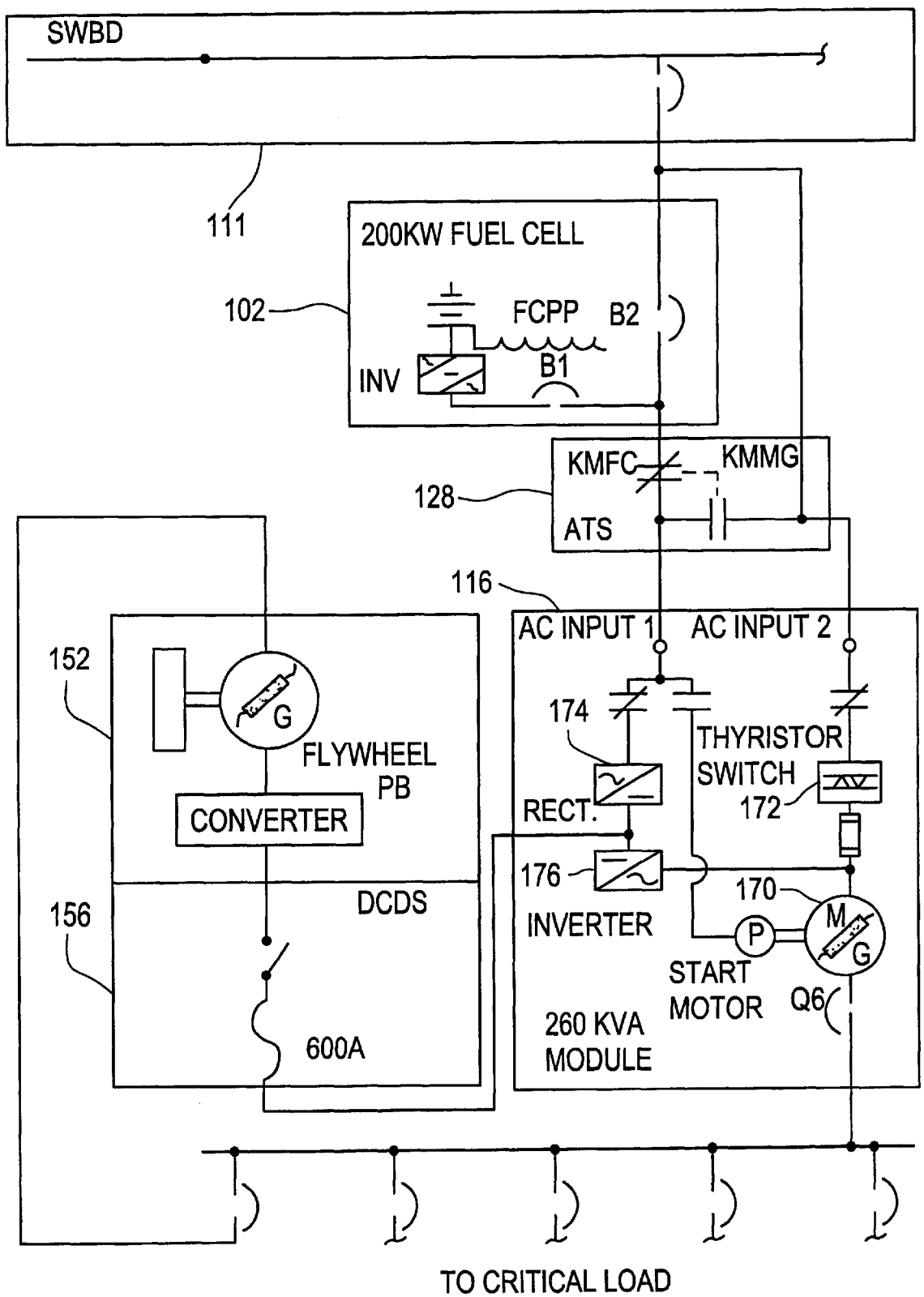
FIG. 3 is a block diagram of a portion of the power system of FIG. 2A–2C.

FIG. 3 is a block diagram of a portion of the power system of FIGS. 2A–2C. Operation of the power system in multiple modes is described with reference to FIG. 3. FIG. 3 depicts one power source 102, one transfer switch 128, one UPS 116 and one flywheel 152. It is understood that other components in the system operate as described with reference to the portion of the system shown in FIG. 3.

For economic purposes, the power source 102 is configured to operate in the grid connect mode when the utility grid is operating. In the grid connect mode, breakers B1 and B2 are closed and the power source 102 generates AC power which is synchronized with the utility grid via a connection at the switchboard 111. Power drawn by the UPS motor-generator 170 flows from the power source 102 through a thyristor switch 172 via AC input 2. Electricity generated by power source 102 in excess of the demand of the UPS 116 powers other building loads via the connection at the switchboard 111. This allows the power source 102 to be operated at full power regardless of UPS 116 power demand. Operating the power source 102 at full power enhances user economics by substituting low cost power source power for high cost utility power that would otherwise be consumed by non-critical building loads.

The transfer switch 128 is configured with switch KMFC closed and switch KMMG open to allow power generated by the power source 102 to flow to the AC input 1 to power motor-generator 170. While the power source is operating in the grid connect mode, the AC input 1 rectifier 174 and inverter 176 are on standby. Power will not flow to motor-generator 170 through AC input 1 until thyristor 172 turns off. The motor-generator 170 supplies energy to flywheel 152. In the grid connect mode, any standby generator is inoperative. If the utility grid power fails, thyristor 172 turns off and switch B2 opens interrupting the grid connect mode of operation and stopping the flow of power source 102 power to AC input 2. When B2 opens, the power source 102 reconfigures to operate in the grid independent mode. This mode transition requires the power source 102 to interrupt power generation resulting in a loss of voltage to switch KMFC and AC input 1 for up to five seconds. During this transition, the AC input 1 inverter 176 activates allowing flywheel 152 to power motor-generator 170. When the power source 102 begins generating electricity again, voltage returns to AC input 1 and the rectifier 174 activates. Power to the motor-generator 170 transfers from flywheel 152 to the power source 102 at a predetermined ramp rate. If an unstable power source re-establishes voltage on the switchboard 111, the power source 102 will not switch to the grid connect mode but will continue to operate in the grid independent mode powering motor-generator 170 via the rectifier 174/inverter 176 path and thyristor 172 remains off. In the grid independent mode, the power source 102 powers down to meet motor-generator 170 power demand only and no power source 102 generated electricity is supplied to other building loads. In grid independent mode, the UPS units 116, 118, 120 and 122 are synchronized through the rectifier 174 and inverter 176 components. In this way, the outputs of the UPS units 116, 118, 120 and 122 can be paralleled.

While operating in the grid independent mode, if the motor-generator 170 experiences a step load greater than a predetermined size, the flywheel 152 becomes the energy source for the motor-generator 170. The source of motor-generator 170 power transfers from the flywheel 152 to the power source 120 at a predetermined ramp rate. Accordingly, the power source 102 is not exposed to a sudden step load.

Three events take place before the power source 102 returns to grid connect mode. First, utility grid voltage is re-established on the switchboard. Second, any standby generator is shut down. Lastly, the flywheel 152 is recharged. At this time, the power source 102 monitors the utility feed for stability. The power source 102 transitions back to the grid connect mode of operation after determining that the grid voltage has been stable for a set period. This transition requires the power source 102 to interrupt generation for up to five seconds. When the loss of voltage at the rectifier 174 is detected, the rectifier 174 goes to standby. If at that moment the output of motor-generator 170 is not in synchronization with the utility grid, the inverter 176 will remain active allowing the flywheel 152 to power the motor-generator 170 until synchronization occurs. When synchronized, thyristor 172 turns on and the AC input 1 inverter 176 goes to standby allowing the utility grid to power the motor-generator 170 during the transition. The motor-generator 170 begins recharging the flywheel 152. When the power source 102 is ready for grid connect operation, B2 closes and the power source 102 ramps up to its maximum output and becomes the motor-generator 170 power source.

Should there be a disruption in utility grid voltage during a transition back to the grid connect mode of operation, the power source 102 will reconfigure for grid independent operation. With the loss of power on AC input 2, thyristor 172 turns off, the AC input 1 inverter 176 activates and the flywheel 152 powers the motor-generator 170. When voltage supplied by the power source 102 returns to the AC input 1 rectifier 174, the rectifier 174 activates and power to motor-generator 170 is ramped from the flywheel 152 to the power source 102. The motor-generator 170 recharges the flywheel 152.

Whenever the power source 102 shuts down or breaker B2 opens, the flow of power from power source 102 stops. The loss of power source 102 to AC input 2 is instantaneously replaced by backup utility grid power at the switchboard 111. Opening both B1 and B2 interrupts voltage on switch KMFC causing a timer to count down. If the power source 102 does not restore voltage to switch KMFC within a preset number of seconds, KMFC opens and KMMG closes thereby connecting AC input 1 to the backup power feed. This also isolates the power source 102. The AC input 1 rectifier 174 and inverter 176 remain on standby and the motor-generator 170 continues to be powered through thyristor 172.

If while the power source 102 is off-line the utility grid fails, thyristor 172 turns off and the AC input 1 inverter 176 activates allowing the flywheel 152 to power the motor-generator 170. Should the energy stored by flywheel 152 be depleted before the utility returns, the motor-generator 170 will shut down unless another power source comes on-line at the switchboard 111. When an unstable voltage source is detected on AC input 2, the rectifier 174 activates to feed power to the motor-generator 170 through the rectifier 174/inverter 176 path. The motor-generator 170 begins recharging the flywheel 152, otherwise the motor-generator 170 is powered via AC input 2. The combination of a power source 102, transfer switch 128, UPS 11 and flywheel 152 may be referred to as a power module. Utilizing redundant power modules (such as shown in FIGS. 2A–2C) eliminates the need for a non-utility power source when the utility grid fails while servicing an off line power source.

As described above, the exemplary power system can operate independent of the utility grid indefinitely. Commercially available fuel cell power modules are designed for long-term, grid independent operation. Redundant sources of natural gas in the form of independent redundant supplies from the local natural gas distribution company or on site storage of an alternative fuel source (i.e. liquefied natural gas, propane, methanol) provide for any disruption in the normal supply of natural gas. The components of the system are of utility grade designed for an economic life of twenty years or more. The modularity of the systems allows maintenance, overhaul, upgrade and expansion without disrupting power flow to the critical loads.

The exemplary power system also has no single points of failure. The system is configured such that the failure of any fuel cell power module, automatic transfer switch or rotary device will not disrupt power flow to the critical loads. Redundant fuel cell power modules comprise the B bus. In configurations that do not include a B bus, redundant fuel cell power modules are included in the A bus. Some configurations include redundant fuel cell power modules on the A bus along with the B bus. The automatic transfer switch and rotary devices have redundant power paths. System controllers typically have redundant processors and power supplies. Tie breakers provide for sharing power among buses if an automatic transfer switch or rotary device fails. Also, automatic transfer switches and rotary devices may include bypass circuits to provide fuel cell power directly to the load when such switches and rotary devices are off-line.

The exemplary power system synchronizes the frequency of all power sources in the system to a common reference source. The electrical outputs of all system power sources must have the same frequency, magnitude, and phase to allow rapid switching among the power sources without disrupting the load. The fuel cell power modules, rotary devices and automatic transfer switches contain synchronization circuits that allow the system to synchronize to a single reference. When a utility grid is interfaced with the system, the system is synchronized to the utility. If the utility fails, a secondary reference signal is substituted. When utility service is restored, it is unlikely to be synchronized with this secondary reference. When this occurs the power modules gradually adjust the phase and magnitude of their outputs to match the new utility source. When a utility grid is not interfaced with the system, a separate means of transmitting the reference signal is incorporated into the system.

One advantage of having the power sources connected to the utility grid is that power generated by the power sources (e.g. fuel cells) that is not consumed by the critical loads is directed to non-critical loads that are coupled to the utility grid. Thus, the user can operate the power sources above the requirement of the critical load and produce excess power to supplant power from the utility grid.

The exemplary power system also operates autonomously. No human intervention is required for normal operation. Each fuel cell power module, automatic transfer switch and rotary device operates automatically in accordance with the programming, functioning and sequencing of its own autonomous controller.

The exemplary power system can power loads that exceed the rated capacity of a single fuel cell power module. If the requirement for power exceeds the rated capacity of a single fuel cell power module, the load can be satisfied either of two ways or by combination of these ways: 1) by paralleling the outputs of multiple fuel cell power modules on a single bus to share load among the units; or 2) by paralleling the outputs of multiple rotary devices that are individually powered by fuel cell power modules.

The exemplary power system prevents faults from causing the fuel cell power modules to go to the idle mode thereby effectively shutting down power generation. The fuel cell power module's control system is designed to protect the fuel cell inverter from damage due to current overload resulting from a downstream fault. Commercially available fuel cell power modules can not supply adequate fault current to clear breakers. If the controller detects a current rise resulting from a fault that exceeds inverter parameters, it disconnects the unit from the load and initiates transfer to the idle mode. Rotary devices are incorporated at appropriate locations throughout the system downstream of the fuel cell power modules to provide fault current, thereby preventing the fuel cell power modules from ever seeing a fault condition.

The exemplary power system prevents step loads and overloads from causing the fuel cell power modules to go to the idle mode thereby effectively shutting down power generation. The fuel cell power module's control system is designed to protect the cell stack from events that may cause cell stack damage. If the controller detects a voltage collapse resulting from a step load or an overload, it disconnects the unit from the load and initiates transfer to the idle mode. The fuel and air supply valves on commercially available fuel cell power modules can not anticipate step loads. Commercially available fuel cell power modules can not carry overloads greater than 110% of rated capacity nor can they carry an overload for more than five seconds. Step loads and overloads can stress the cell stack causing voltage to collapse. Flywheels are incorporated at appropriate locations in the system to provide power for phasing step loads on line thereby allowing the fuel and air valves to adjust to settings appropriate to the load without shutdown. Flywheels are integrated with rotary UPS units to carry overloads up to 150% of rated capacity for two minutes thereby allowing an orderly transfer of an overload to an alternate power source.

The exemplary power system prevents transient overloads from causing the fuel cell power modules to go to the idle mode thereby effectively shutting down power generation. The fuel cell power module's control system is designed to protect the fuel cell from transient overloads that may damage the inverter. If the controller detects a transient overload greater that 110% of rated capacity, it disconnects the unit from the load and initiates transfer to the idle mode. Commercially available fuel cell power modules can not carry overloads greater than 110% of rated capacity nor can they carry any overload for more than five seconds. Transient overloads can cause the voltage to collapse. Flywheels are integrated with rotary UPS units to carry transient overloads up to 150% of rated capacity for two minutes.

The exemplary power system prevents load unbalance from causing the fuel cell power modules to go to the idle mode thereby effectively shutting down power generation. A 10% single phase current unbalance at rated load and 190% of rated current line to neutral cause unbalance overloads on commercially available fuel cell power modules. This condition will cause the fuel cell power module to disconnect from the load and initiate transfer to the idle mode. The motor generator and rotary UPS unit of choice have 100% capability for load unbalance. These rotary devices are located downstream of the fuel cell power modules to prevent the power modules from being exposed to a load unbalance condition.

Figure 4A:
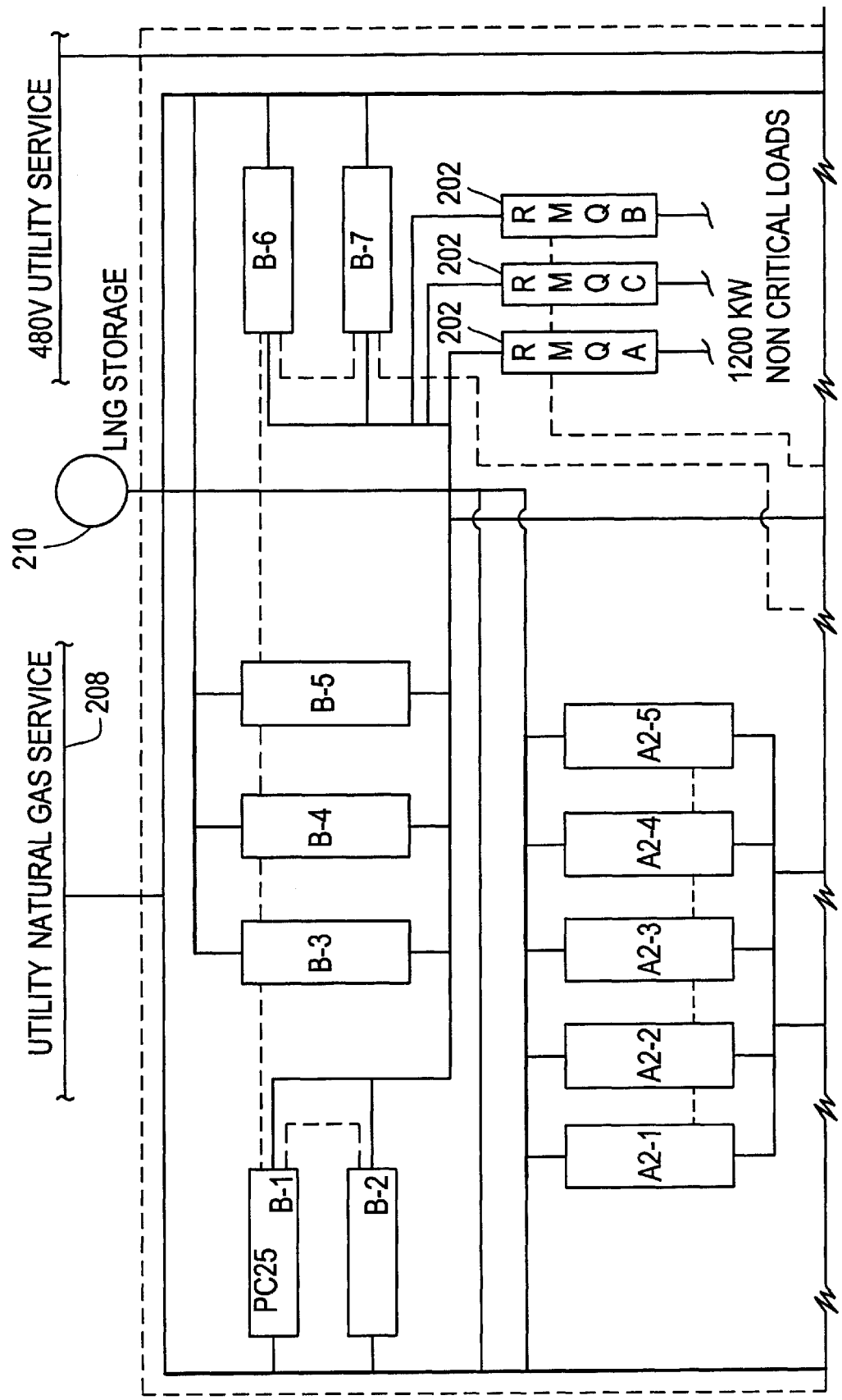
FIGS. 4A–4B are a block diagram of an alternate power system.
Figure 4B:
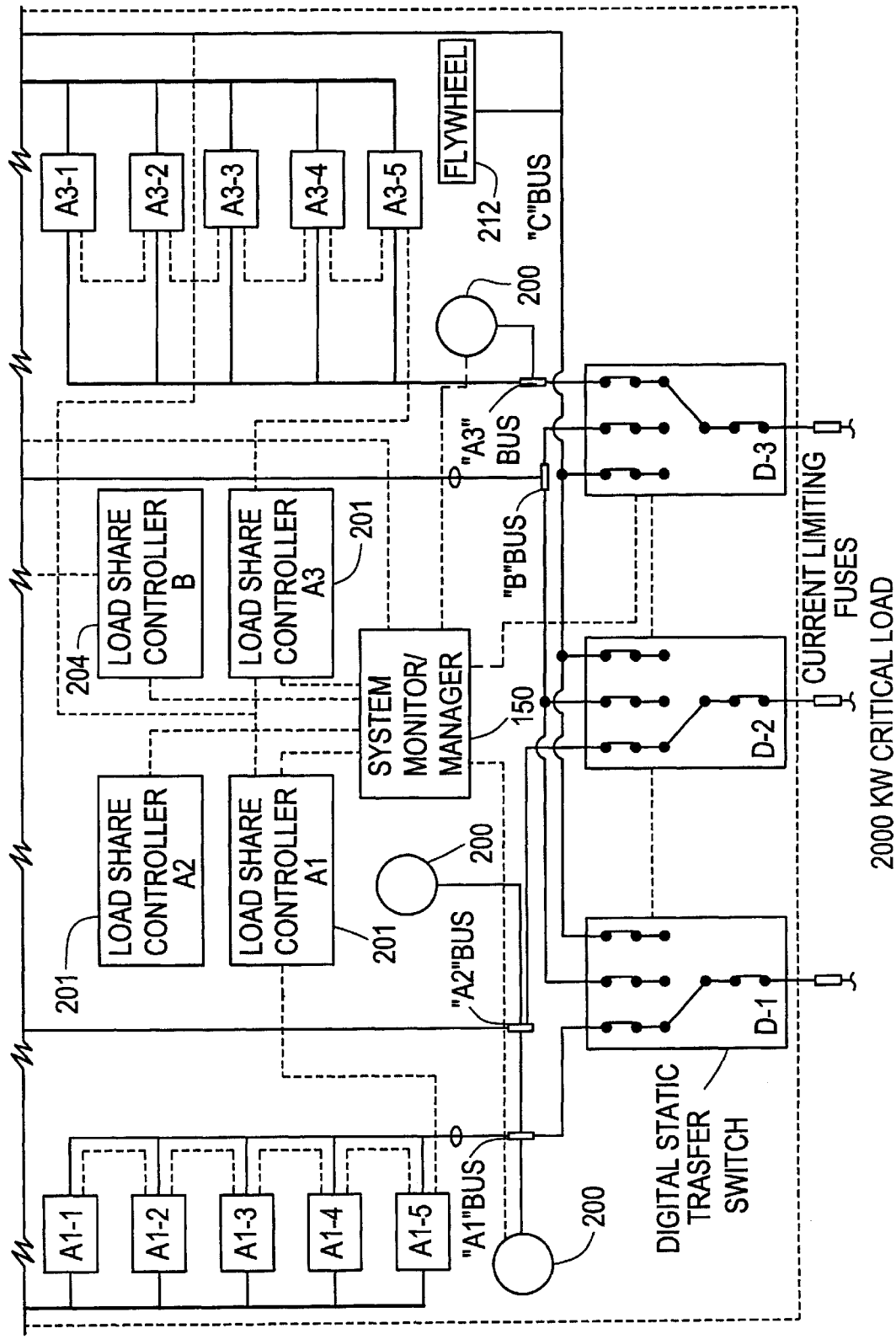

FIGS. 4A–4B are a diagram of an alternative power system including three independent primary buses labeled A1, A2 and A3. Each A bus is supplied by a bank of 5 fuel cells A1-1 to A1-5, A2-1 to A2-5, and A3-1 to A3-5. The banks of five fuel cells are connected in parallel in a load sharing configuration. The rotary device associated with each primary bus is a synchronous condenser 200. A load share controller 201 is associated with each bus A1, A2 and A3 and provides control signals to the fuel cells to ensure proper load sharing. The secondary or B bus is supplied by 7 fuel cells B-1 to B-7 which are coupled in parallel in a load sharing configuration. A load share controller 204 is coupled to the B bus to provide control signals to the fuel cells and ensure proper load sharing. A plurality of motor generator units 202 are powered by the B bus and supply power to non-critical loads while isolating the fuel cells B-1 to B-7 from the critical loads. A system monitor/manager 150 is also provided and serves the same purpose as described above with reference to FIGS. 2A–2C. A utility source of power provides the C bus. A flywheel 212 is connected to the C bus to provide ride through power for voltage sags. A series of static transfer switches D1, D2 and D3 select the appropriate source so that critical loads receive un-interrupted power.

As shown in FIGS. 4A–4B, the secondary or B bus serves as backup to the A bus. When not supplying electricity to the critical load, the B bus can supply power to other facility loads ("non-critical loads") through one or more customer feeders. Typically, B bus feeders are connected to the B bus via automatic transfer switches. However, the B bus may employ one or more rotary devices depending on the parameters of the system's configuration and wants and needs of the customer. The B bus may be unitized or segmented depending on customer wants and needs. The B bus interfaces with the critical loads through the second source pole on automatic transfer switches D1–D3 or through rotary devices such as rotary UPS. Also, a synchronous condenser may be located on the output of the automatic transfer switch.

To add additional redundancy, two sources of natural gas are provided for the fuel cells. A utility natural gas source 208 and a second local natural gas storage device 210 are used to provide redundant natural gas supply to the fuel cells.

The exemplary power system prevents cascade failure of the fuel cell power modules. Segmentation of the A Bus and the incorporation of a segregated B Bus and C Bus provide barriers to cascade failures. In some configurations, automatic transfer switches are programmed not to transfer faults. Automatic transfer switches, motor generator and rotary UPS units can be used to isolate loads from each other. Motor generator units and rotary UPS units also isolate, the fuel cell power modules from the loads and each other. Isolating the fuel cell power modules from events that may cause the power modules to fail or transfer to the idle mode prevents cascade failure.

Figure 5:
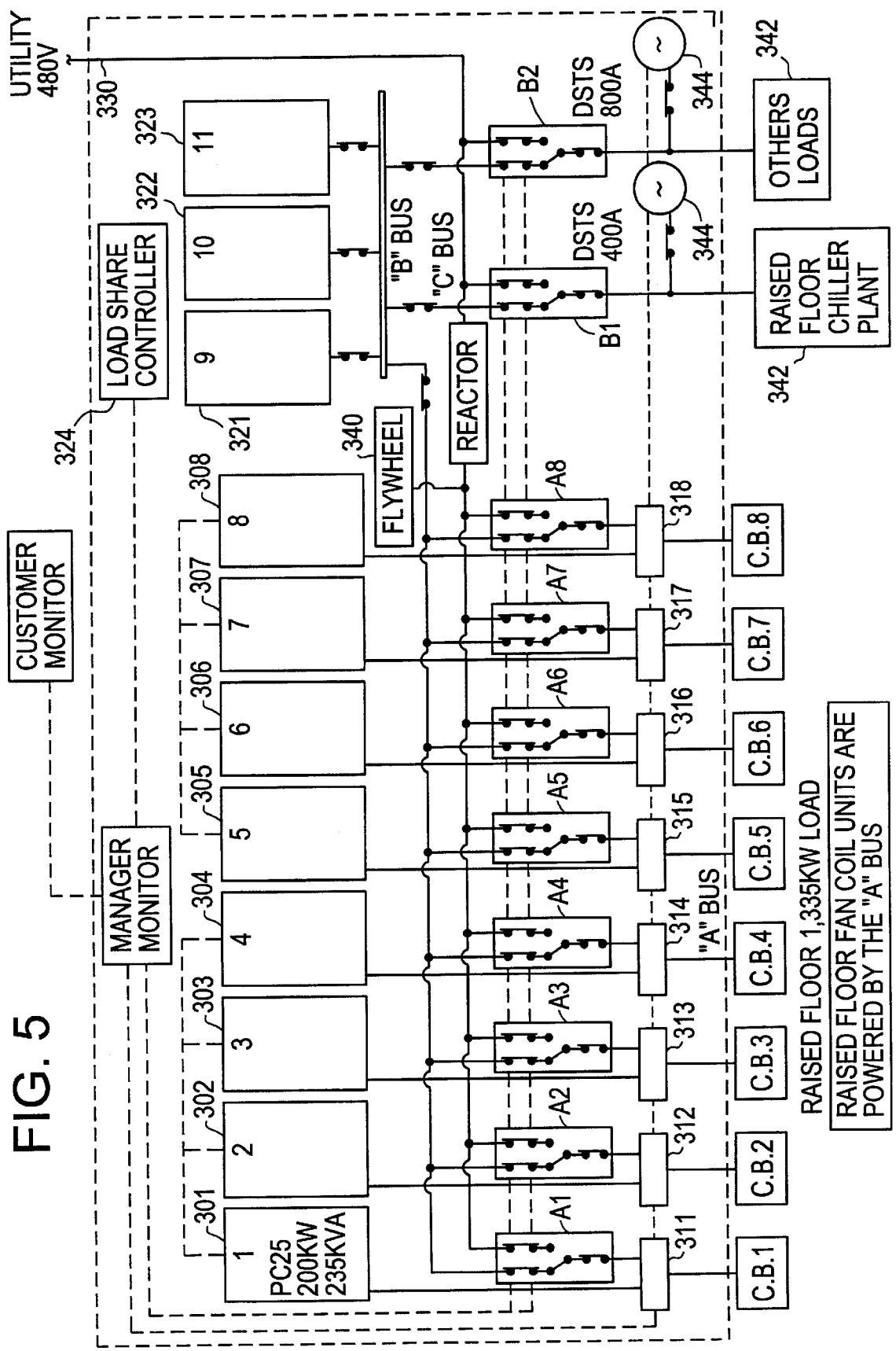
FIG. 5 is a block diagram of an alternate power system.

FIG. 5 is a diagram of another power system including components of the present invention. As shown in FIG. 5, the primary or A bus is comprised of 8 individual power sources (e.g. fuel cells). Each power source 301–308 is connected to a rotary device 311–318 such as a UPS sold by Piller. The secondary or B bus is formed by three power sources 321–323 connected in parallel and controlled by a load share controller 324. The C bus is provided by a utility line 330. A flywheel 340 is connected to the C bus.

The B bus and the C bus are connected to respective poles of automatic transfer switches A1–A8. The automatic transfer switches A1–A8 select the better power source between the B bus and the C bus for supply to the rotary devices 311–318. The output of each rotary device 311–318 is coupled to one of eight critical loads CB1–CB8. The rotary devices are programmed to prefer the A bus power sources 301–308. The B bus and the C bus are also connected to respective poles of automatic transfer switches B1 and B2 which direct power to other loads. The rotary device associated with the loads 342 are synchronous condensers 344. The system of FIG. 5 is another example of a power system utilizing redundant power sources, rotary devices and automatic transfer switches to provide reliable power to critical loads.

FIGS. 2A–2C, 4A–4B and 5 illustrate various configurations of redundant power sources, rotary devices and automatic transfer switches to provide a high reliability power system. The primary and secondary bus configuration and the type, size and number of power sources, rotary devices and automatic transfer switches are determined by the size of the load, the number of feeders required and the system availability desired by the user (i.e. how reliable does the consumer require the power).

Figure 6:
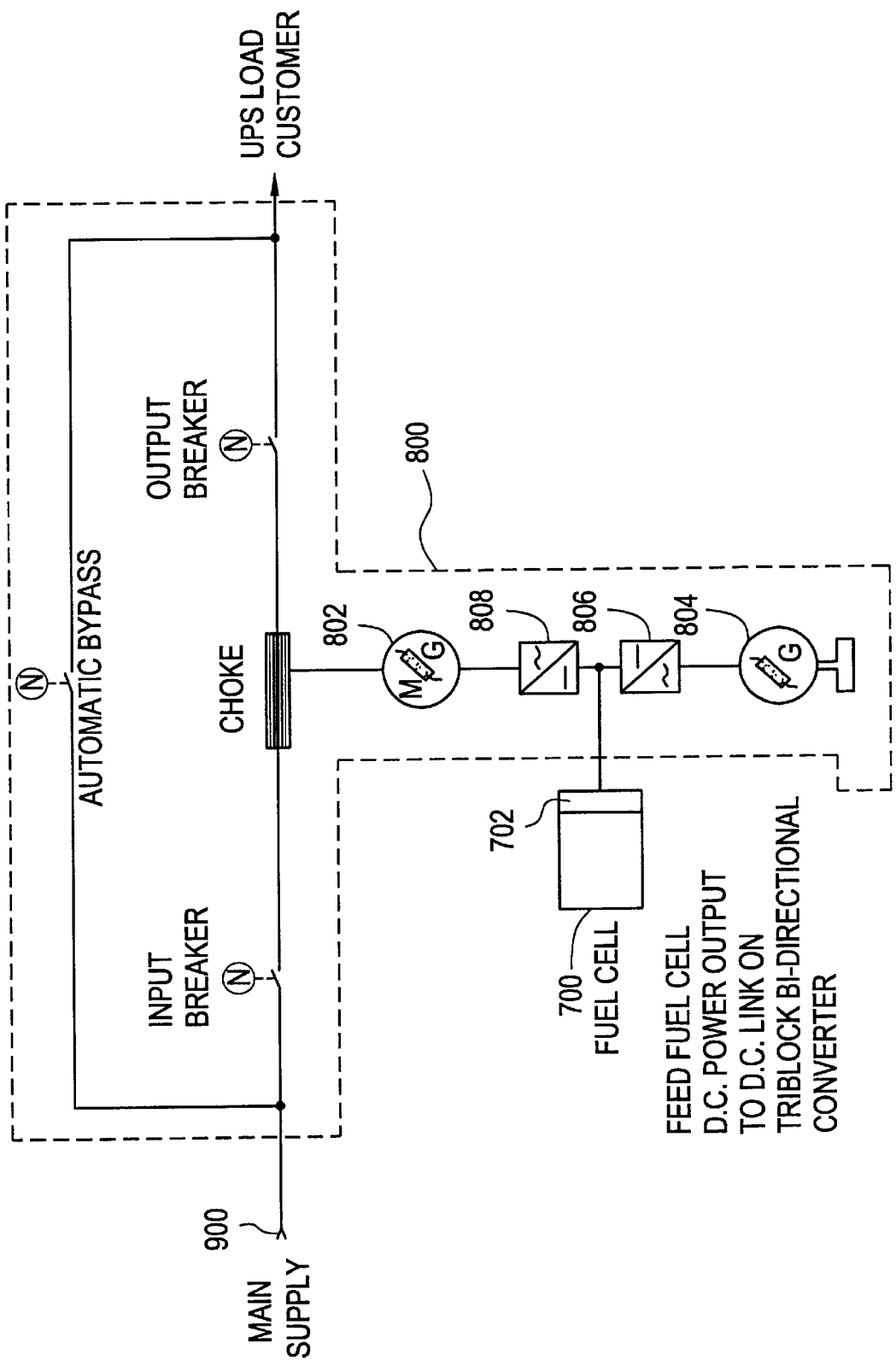
FIG. 6 is a block diagram of a power system in another embodiment of the invention.

FIG. 6 depicts an alternate embodiment of the invention. Shown in FIG. 6 is an existing power conditioning unit 800. Power conditioning unit 800 may be a Triblock brand unit sold by Piller, Inc. The power conditioning unit includes a motor generator 802 which regulates output voltage, absorbs harmonics, etc. A flywheel 804 provides power if the utility grid main supply 900 fails. The flywheel 804 powers the motor-generator 802 through a rectifier 806 and inverter 808. Also shown in FIG. 6 is a fuel cell 700 having a DC output section 702. The DC output section may be implemented using a DC-DC converter such as that shown in FIG. 6. The DC output of the fuel cell 700 is connected to the input of inverter 808. Accordingly, the fuel cell 700 can provide power to the load and the utility grid when the main supply 900 is available or unavailable.

Figure 7:
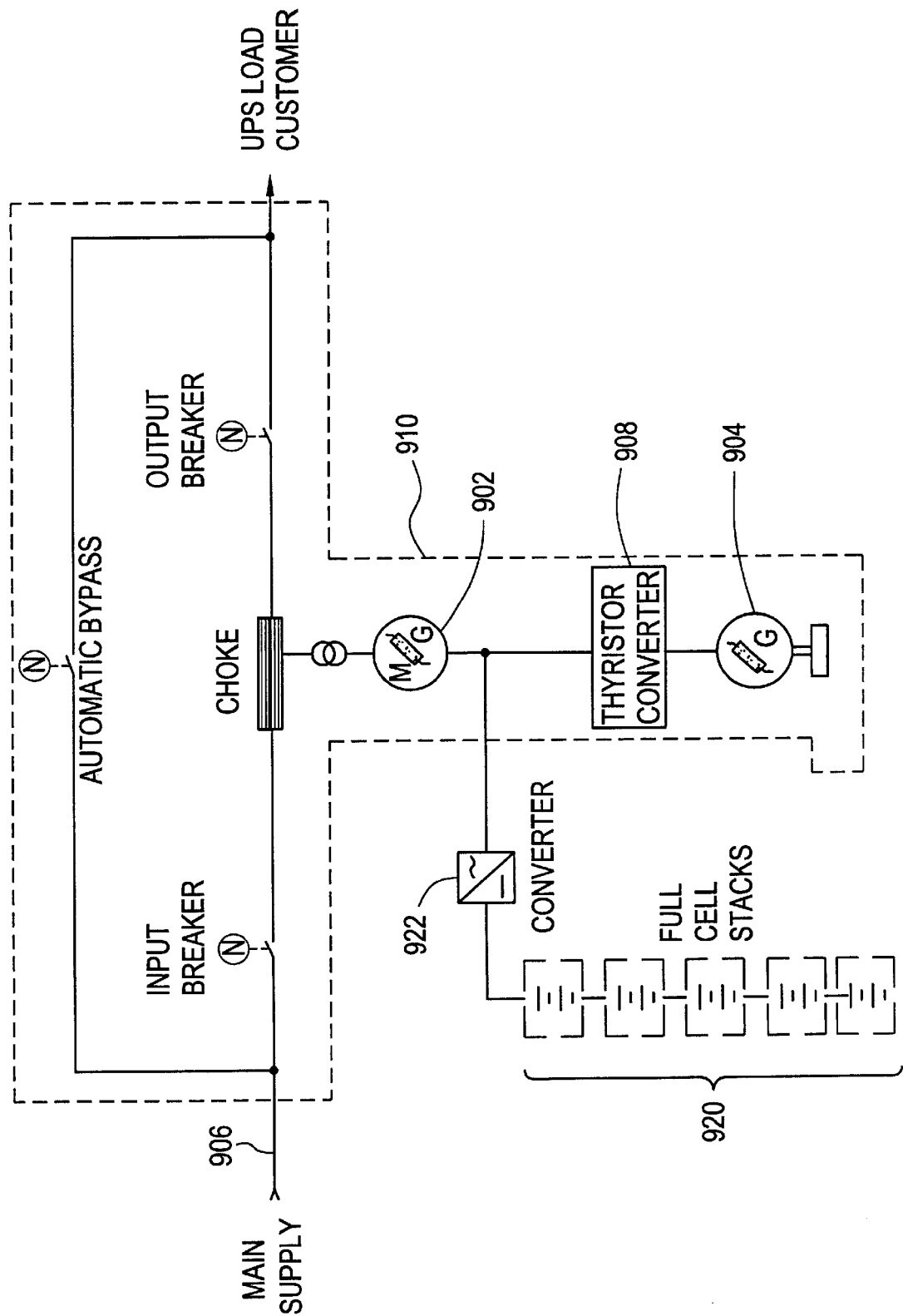
FIG. 7 is a block diagram of a power system in another embodiment of the invention.

FIG. 7 depicts another alternate embodiment of the invention. Shown in FIG. 7 is an existing power conditioning unit 910. Power conditioning unit 910 may be a Triblock brand unit sold by Piller, Inc. The power conditioning unit includes a motor generator 902 which regulates output voltage, absorbs harmonics, etc. A flywheel 904 provides power if the utility grid main supply 906 fails. The flywheel 904 powers the motor-generator 902 through a bi-directional converter 908. Also shown in FIG. 7 is a fuel cell stack 920 having a DC output. The DC output of the fuel cell stack 920 is connected to the input of a DC-AC converter 922. Accordingly, the fuel cell stack 920 can recharge the flywheel 904 through converter 908 or provide power to the load and the utility grid through motor generator 902.

Figure 8:
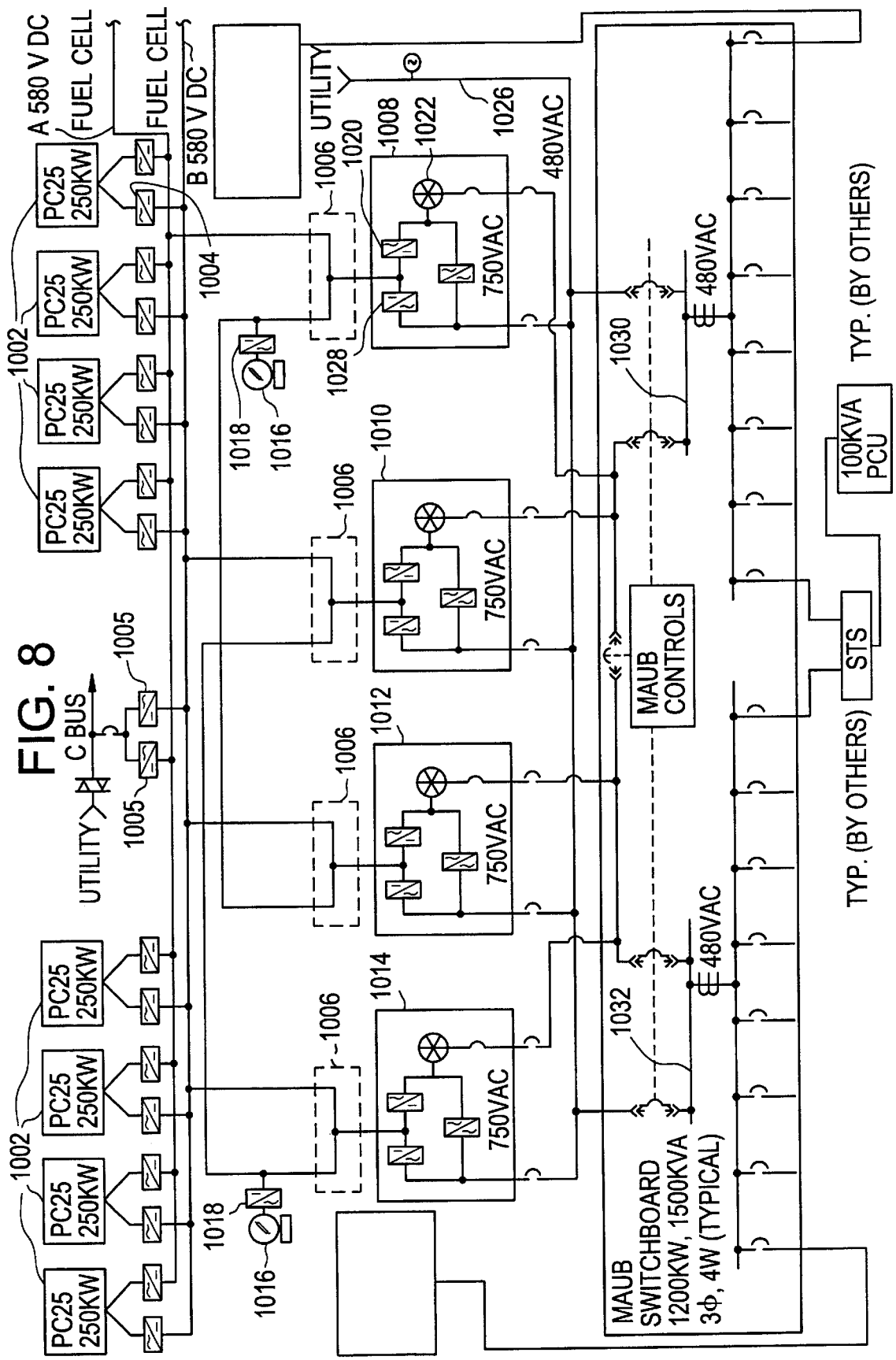
FIG. 8 is a block diagram of a power system in another embodiment of the invention.

FIG. 8 is a block diagram of a power system in another embodiment of the invention. As shown in FIG. 8, the power system includes a plurality of power sources 1002. The power sources may be known devices including fuel cells such as the PC25 available from Onsi Corporation. Each power source 1002 generates a DC output which is coupled to a pair of DC-DC converters 1004. For each pair of DC-DC converters 1004, one converter is coupled to an A bus and the other is coupled to a B bus. Thus, each power source 1002 drives both the A bus and the B bus. The A bus and B bus are each connected to a C bus (e.g., auxiliary loads) through inverters 1005. Rotary devices 1008, 1010, 1012 and 1014 are connected to the A bus and the B bus through switches 1006. Rotary devices 1008, 1010, 1012 and 1014 may be implemented by un-interruptible power systems (UPS). A suitable UPS is the Uniblock-II brand sold by Piller. The UPS's 1008–1014 are augmented by a rotary device 1016 such as a Powerbridge brand flywheel. The output of the rotary device 1016 is provided to an AC-DC converter 1018. AC-DC converter 1018 provides DC power to an inverter 1020 in UPS 1008 to drive a motor-generator 1022. The UPS 1008 also includes a static switch 1024 to allow a utility grid 1026 to drive the motor-generators 1022. A rectifier 1028 also allows the utility grid 1026 to power motor generator 1022.

The outputs of the UPS 1008 and UPS 1010 are combined and provided to a first critical load bus 1030. A portion of the critical load is connected to first critical load bus 1030. The outputs of UPS 1012 and UPS 1014 are combined provided to a second critical load bus 1032. A portion of the critical load is connected to second critical load bus 1032. This configuration has advantages over that shown in FIGS. 2A–2C. In the embodiment shown in FIGS. 2A–2C, the critical load is driven by one of the A bus or the B bus. Thus, if the B bus is interrupted, a portion of the critical load is not powered. In the embodiment shown in FIG. 8, critical load bus 1030 and critical load bus 1032 are each connected to both the A bus and the B bus providing better redundancy and less chance for failure.

Operation of the system of FIG. 8 will now be described. Under normal operation, the A bus and B bus are intended to assume a predetermined DC voltage (e.g., 580 volts). If the A bus and B bus are at the predetermined voltage, then the fuel cells 1002 power the critical loads and power auxiliary loads if able through the C bus. If the voltage on either the A bus or B bus drops a predetermined amount (e.g., to 560 volts), then the flywheels 1016 are used to augment the power from the fuel cells 1002. The switches 1006 may be controlled by the UPS's or another controller programmed to monitor the system. If the voltage drops further (e.g., to 550 volts) then the utility grid 1026 is used to augment power from the fuel cells 1002 and the flywheel 1016 via rectifier 1028.

Figure 9A:
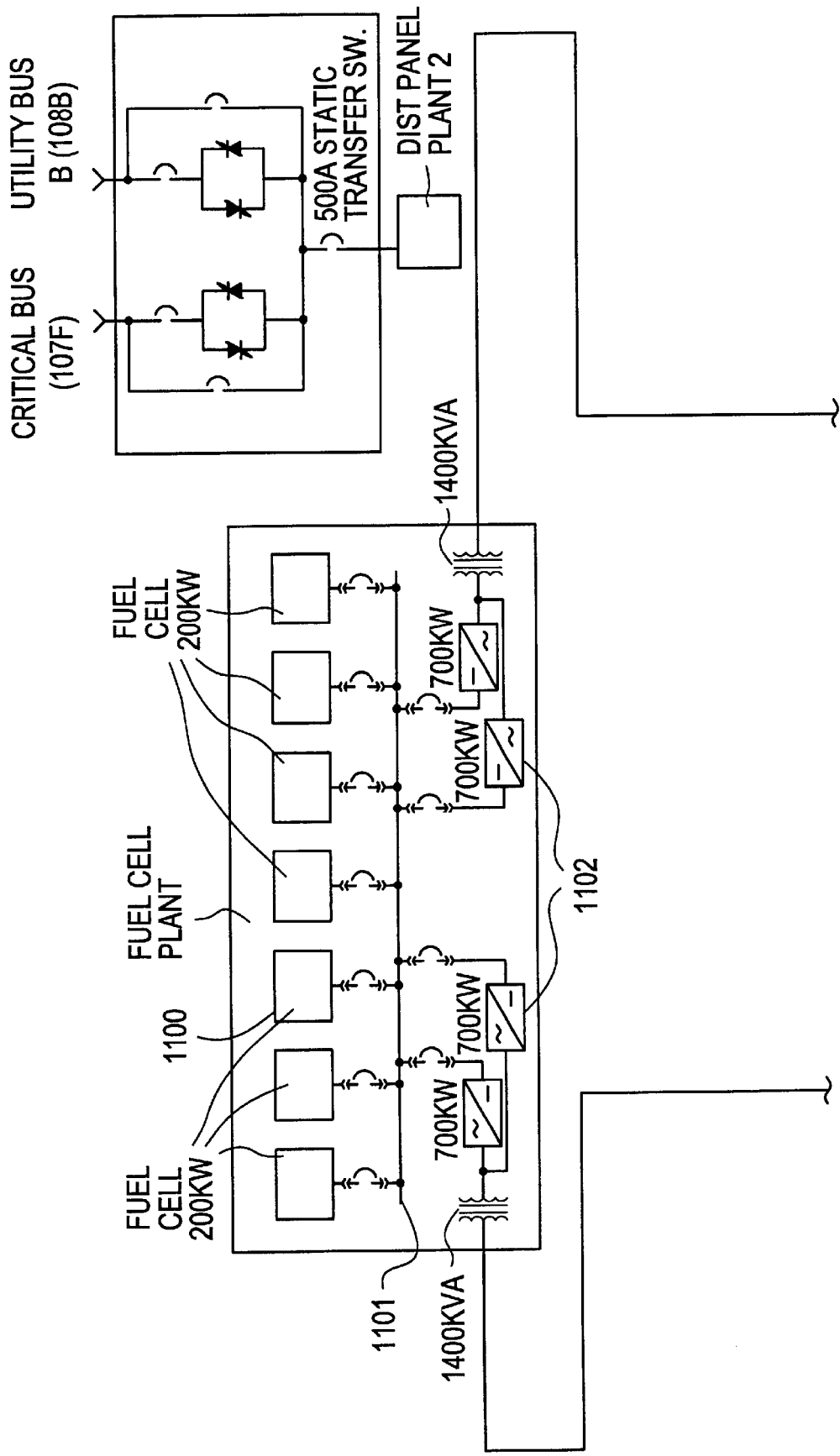
FIGS. 9A–9B are a block diagram of a power system in another embodiment of the invention.
Figure 9B:
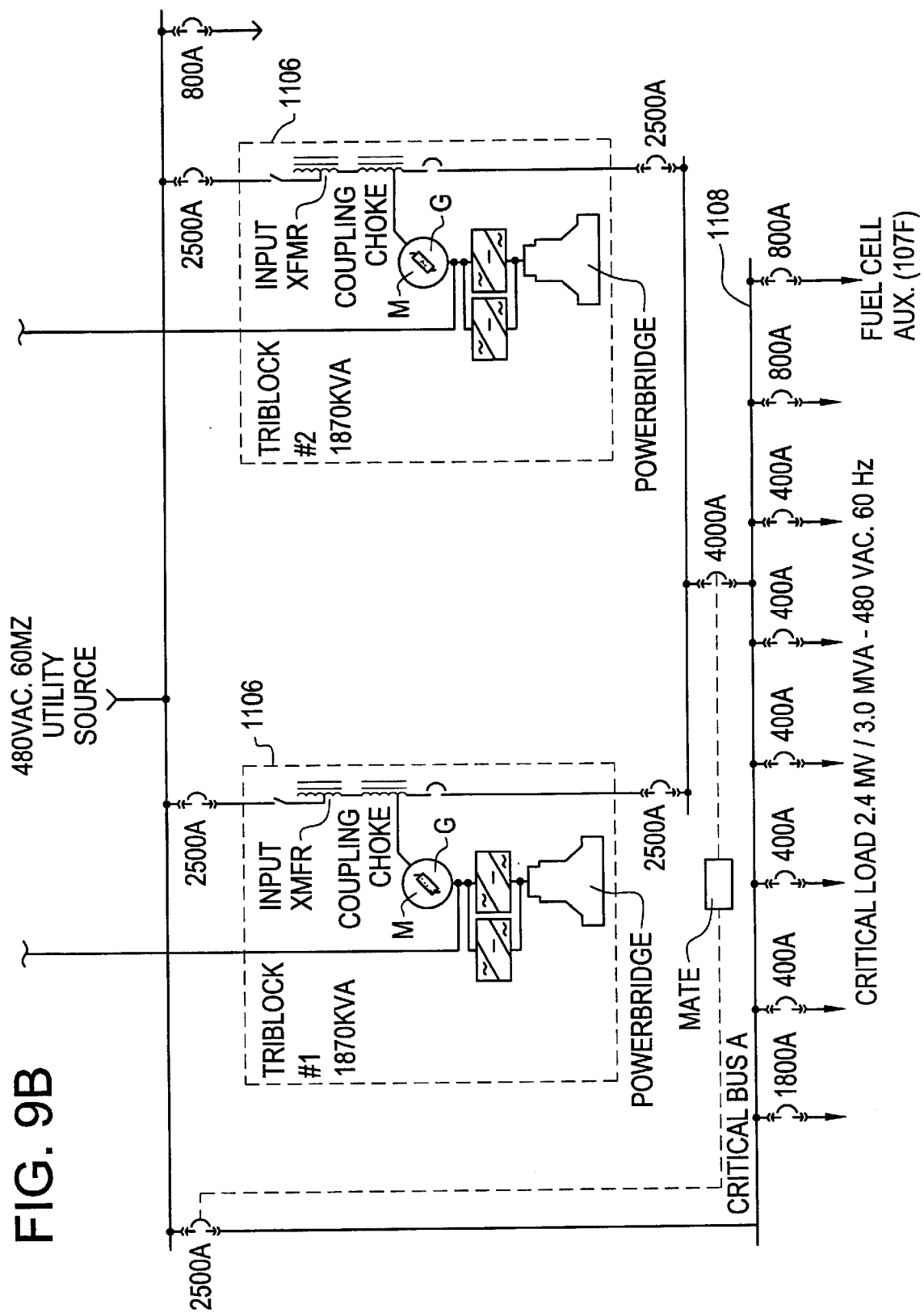

FIGS. 9A–9B depict a power system in another embodiment of the invention. In this embodiment, the system includes a plurality of power sources 1100 (e.g., fuel cells) for generating DC power which are then combined in parallel on a power bus 1101. A number of inverters 1102 convert the DC power to AC and provide AC power to rotary devices 1106 such as Triblock UPS units available from Piller, Inc. The output of the rotary devices 1106 is applied to a single critical load bus 1108.

Figure 10A:
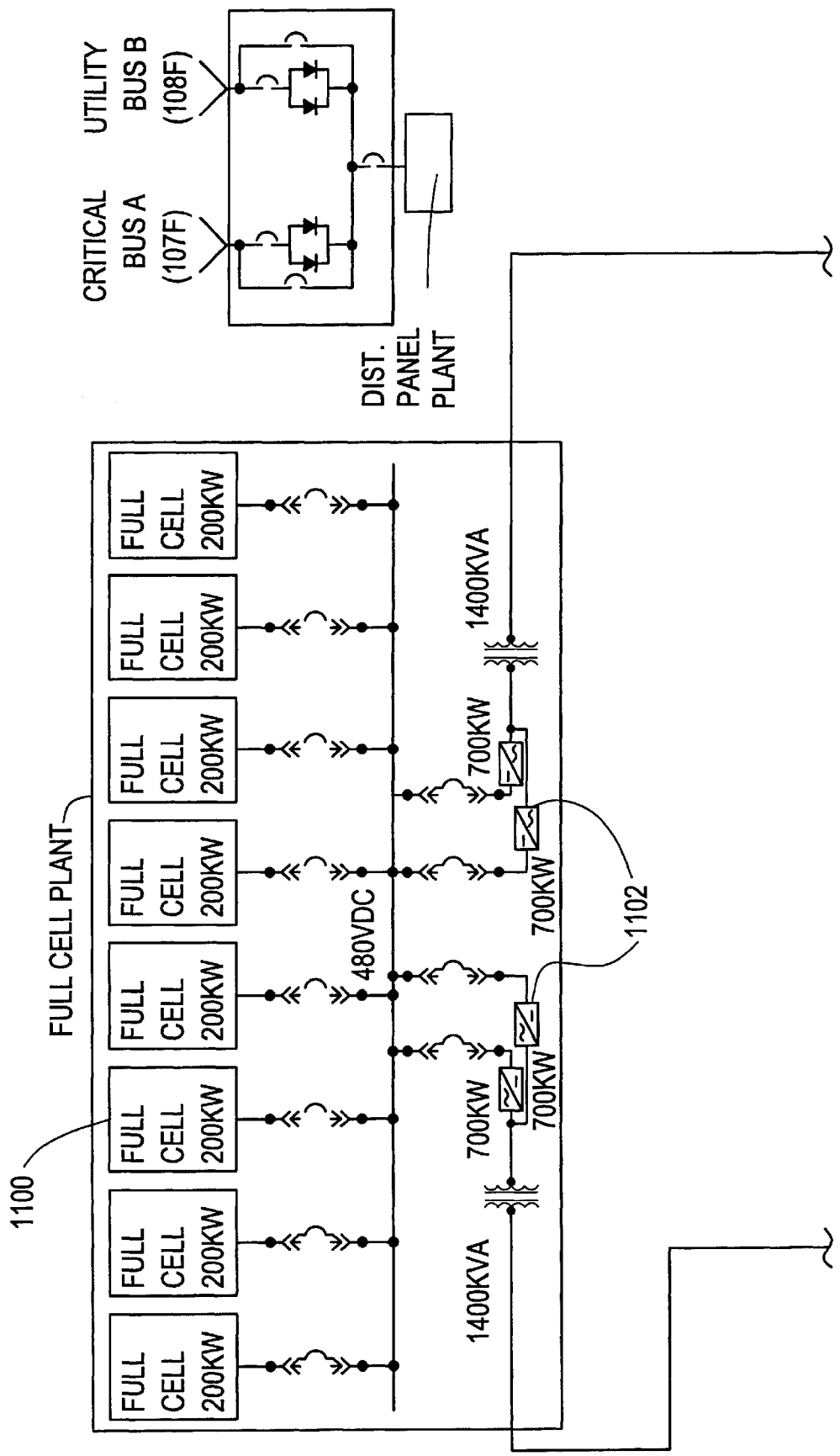
FIGS. 10A–10B are a block diagram of a power system in another embodiment of the invention.
Figure 10B:
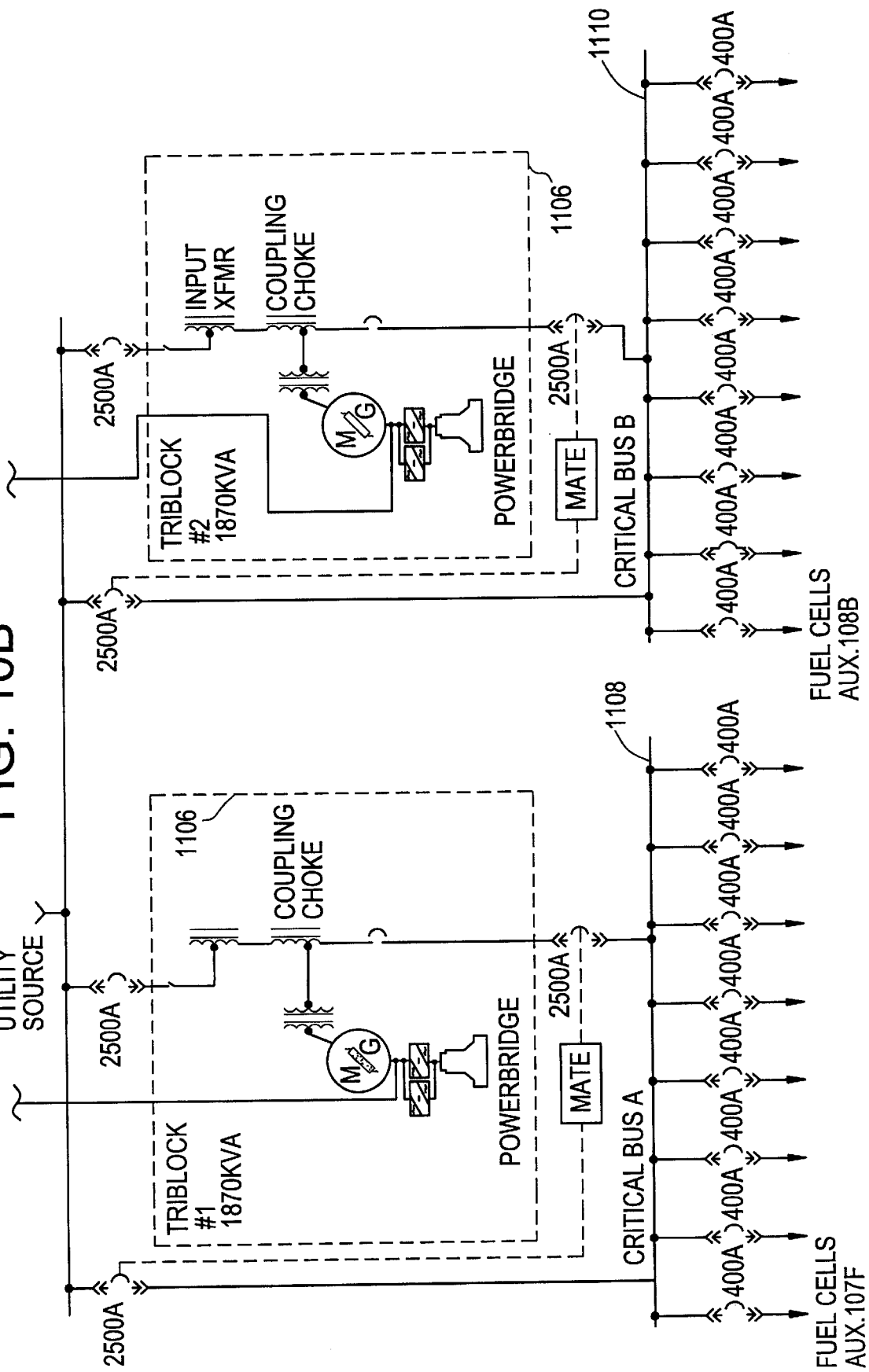

FIGS. 10A–10B depict a power system in another embodiment of the invention. The system of FIGS. 10A–10B is similar to that of FIG. 9 except that two critical load buses 1108 and 1110 are employed. Each critical load bus is powered by a separate rotary device 1106.

Figure 11B:
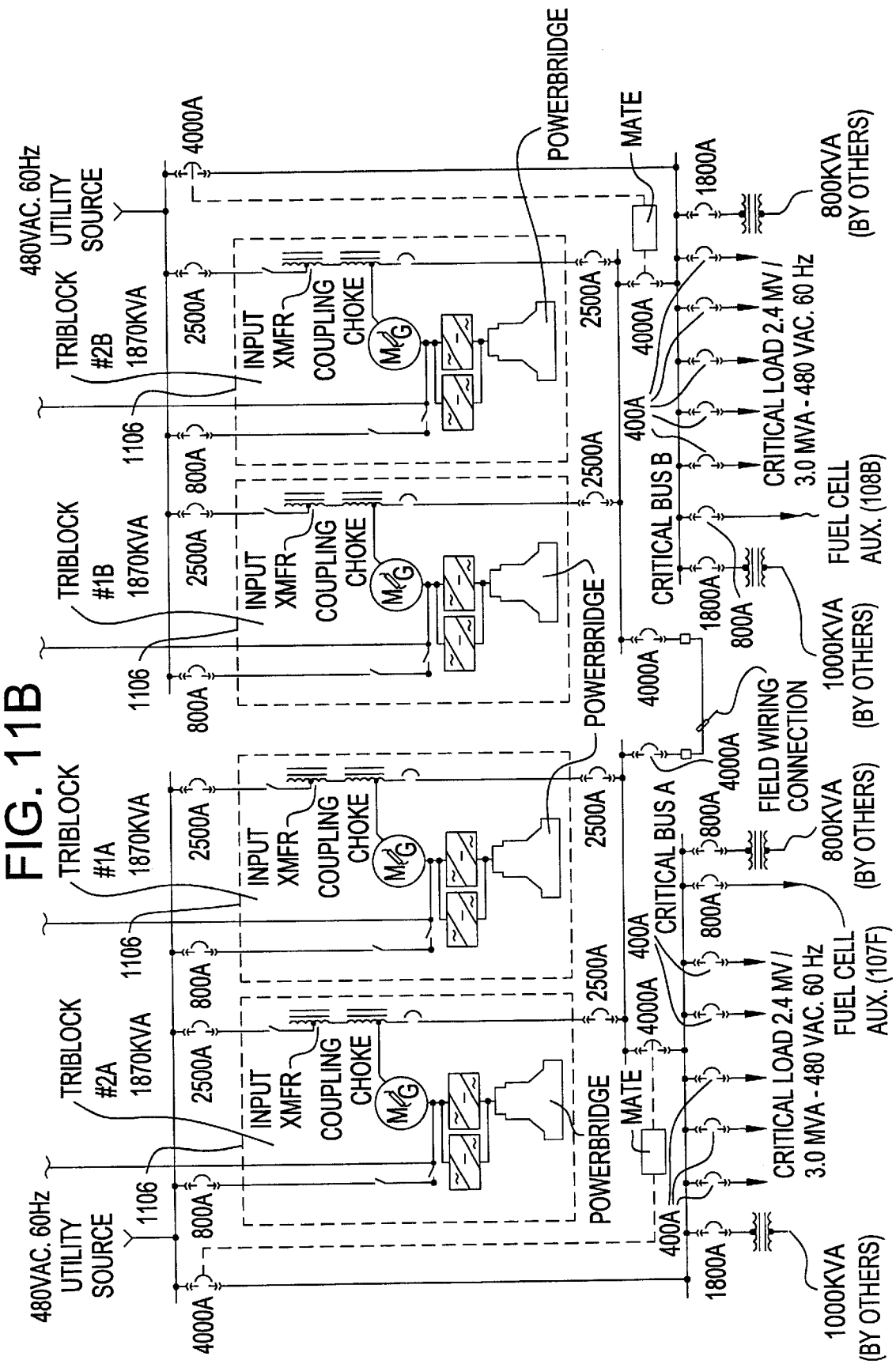

FIGS. 11A–11B depict a power system in another embodiment of the invention. This embodiment includes two banks of power sources 1100. Each bank of power sources 1100 provides power to two rotary devices 1106. The rotary devices 1106 power two critical load buses 1108 and 1110. In this manner, each critical load bus is connected to each bank of power sources cells 1100. Accordingly, if one bank of power sources fails or deteriorates, power to the critical load is available from the other bank of power sources.

Figure 12A:
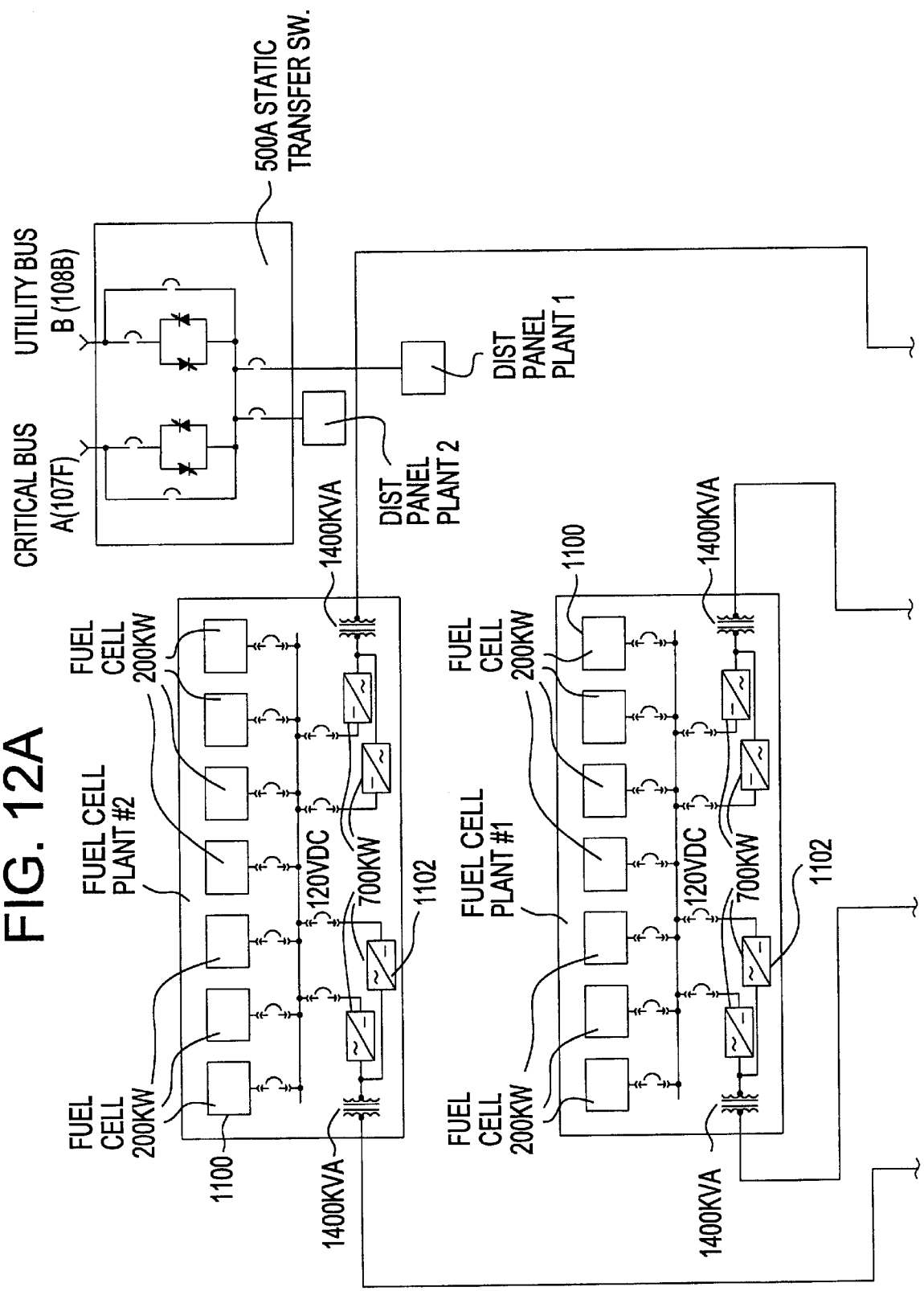
FIGS. 12A–12B are a block diagram of a power system in another embodiment of the invention.
Figure 12B:
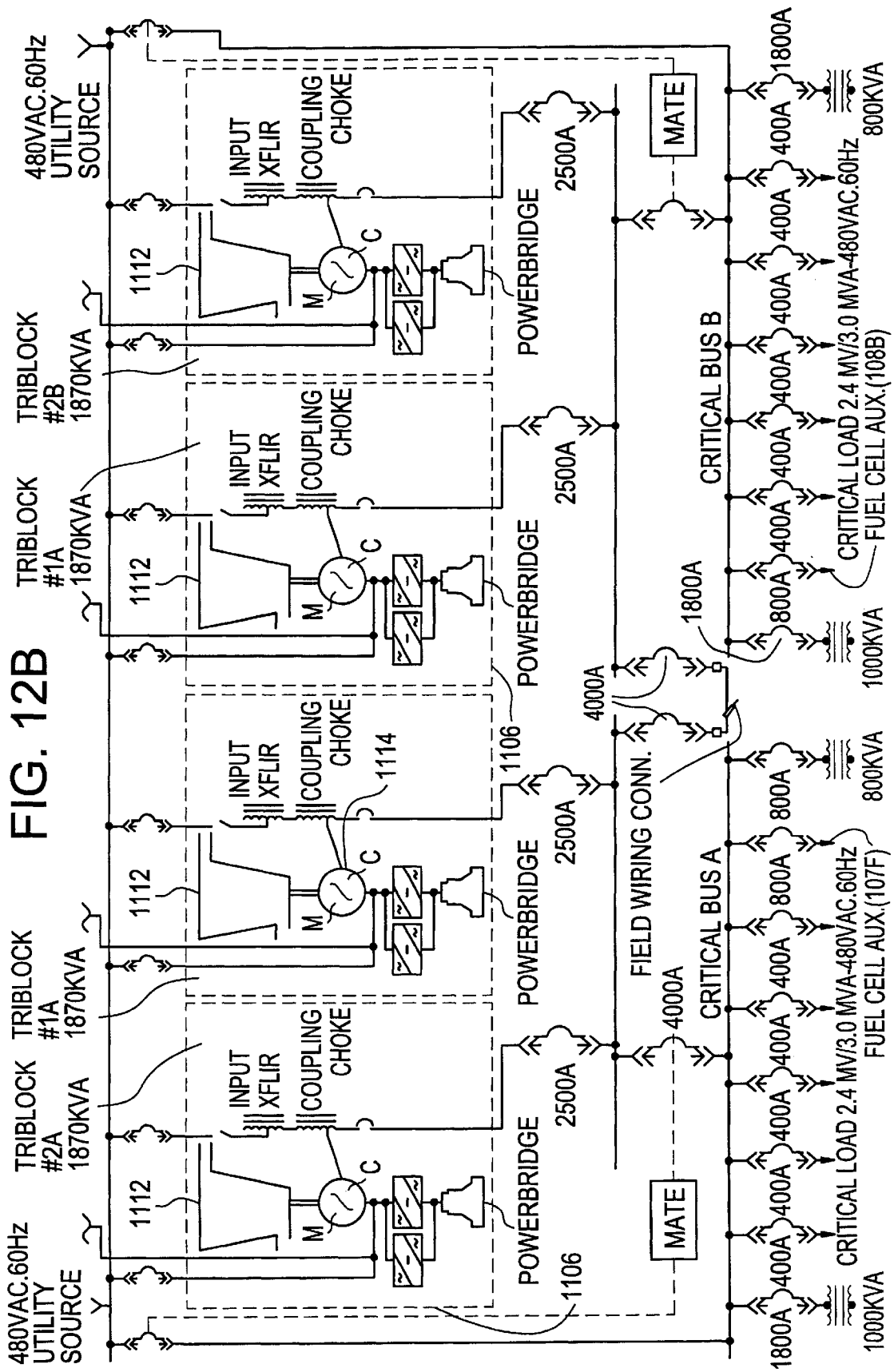

FIGS. 12A–12B depict a power system in another embodiment of the invention. The system of FIGS. 12A–12B is similar to that in FIGS. 11A–11B. In FIGS. 12A–12B, however, each rotary device 1106 is connected to a diesel engine 1112 coupled to the motor generator 1114 through a clutch. The diesel engine may be used to generate power in the event of failure of the power sources 1100.

Figure 13:
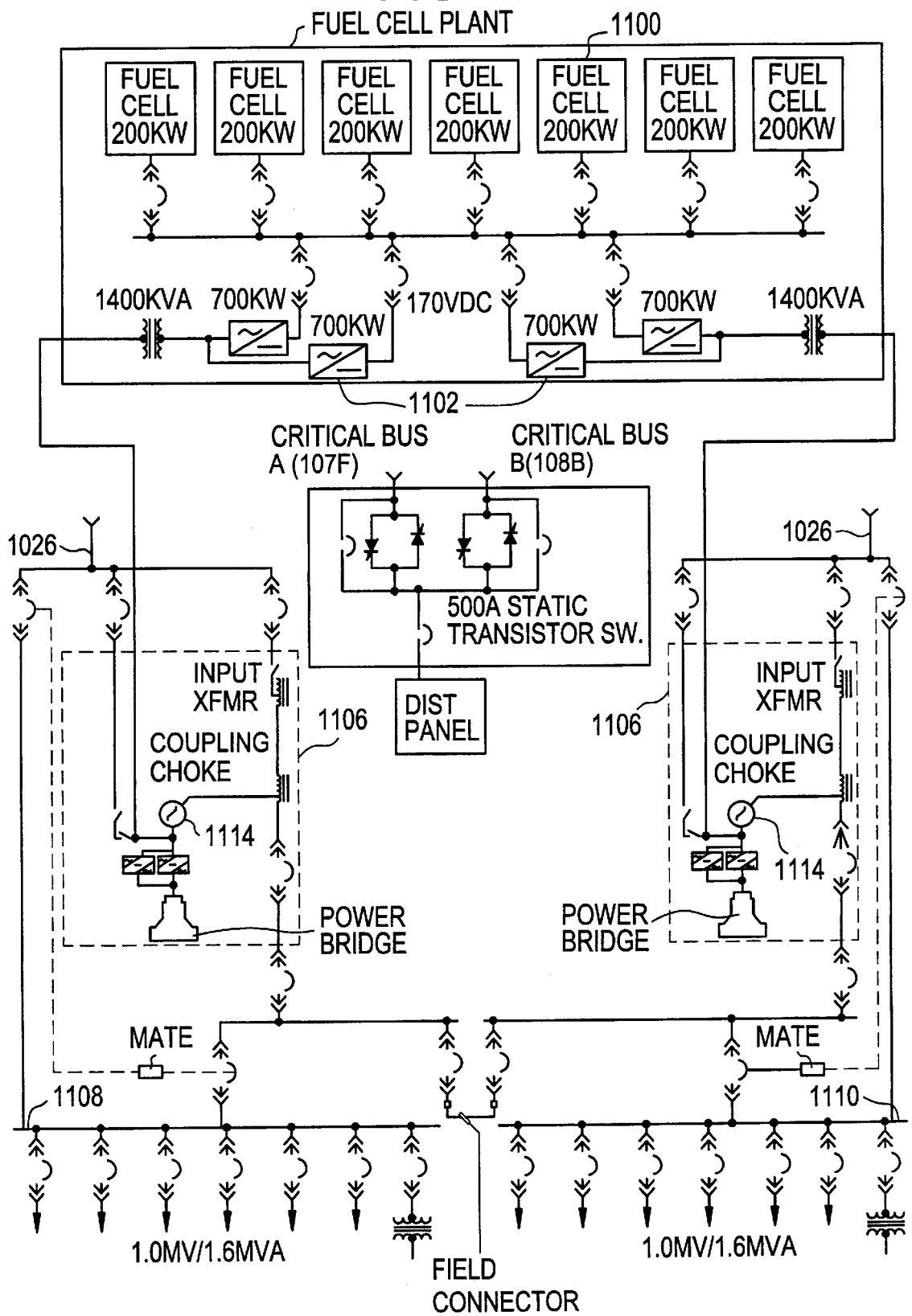
FIG. 13 is a block diagram of a power system in another embodiment of the invention.

FIG. 13 depicts a power system in another embodiment of the invention. The system of FIG. 13 is similar to that in FIGS. 10A–10B. In FIG. 13, however, the utility grid 1026 may be connected through the rotary device 1106 to power the critical load. As shown in FIG. 13, the utility grid 1026 is connected to the motor generator 1114 through switches.

Figure 14:
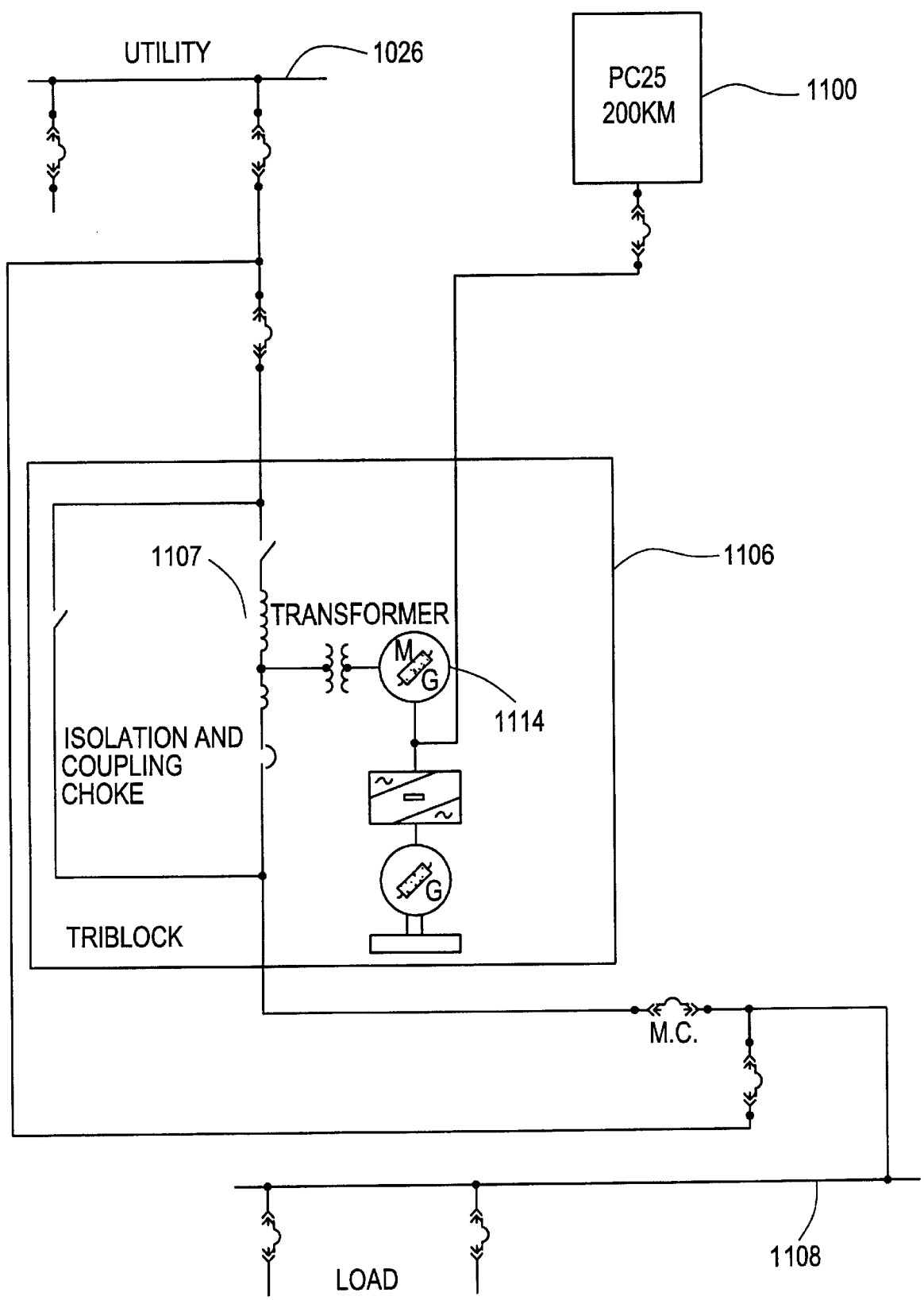
FIG. 14 is a block diagram of a power system in another embodiment of the invention.

FIG. 14 depicts a power system in another embodiment of the invention. A power source 1100 (e.g., a fuel cell) generates AC power and is coupled to the motor generator 1114 of rotary device 1106 such as Triblock UPS units available from Piller, Inc. The utility grid 1026 is connected to the rotary device 1106 through a coupling choke 1107. The critical load bus 1108 receives power from either the power source 1100 (through motor generator 1114) or from the utility grid 1026.

Figure 15:
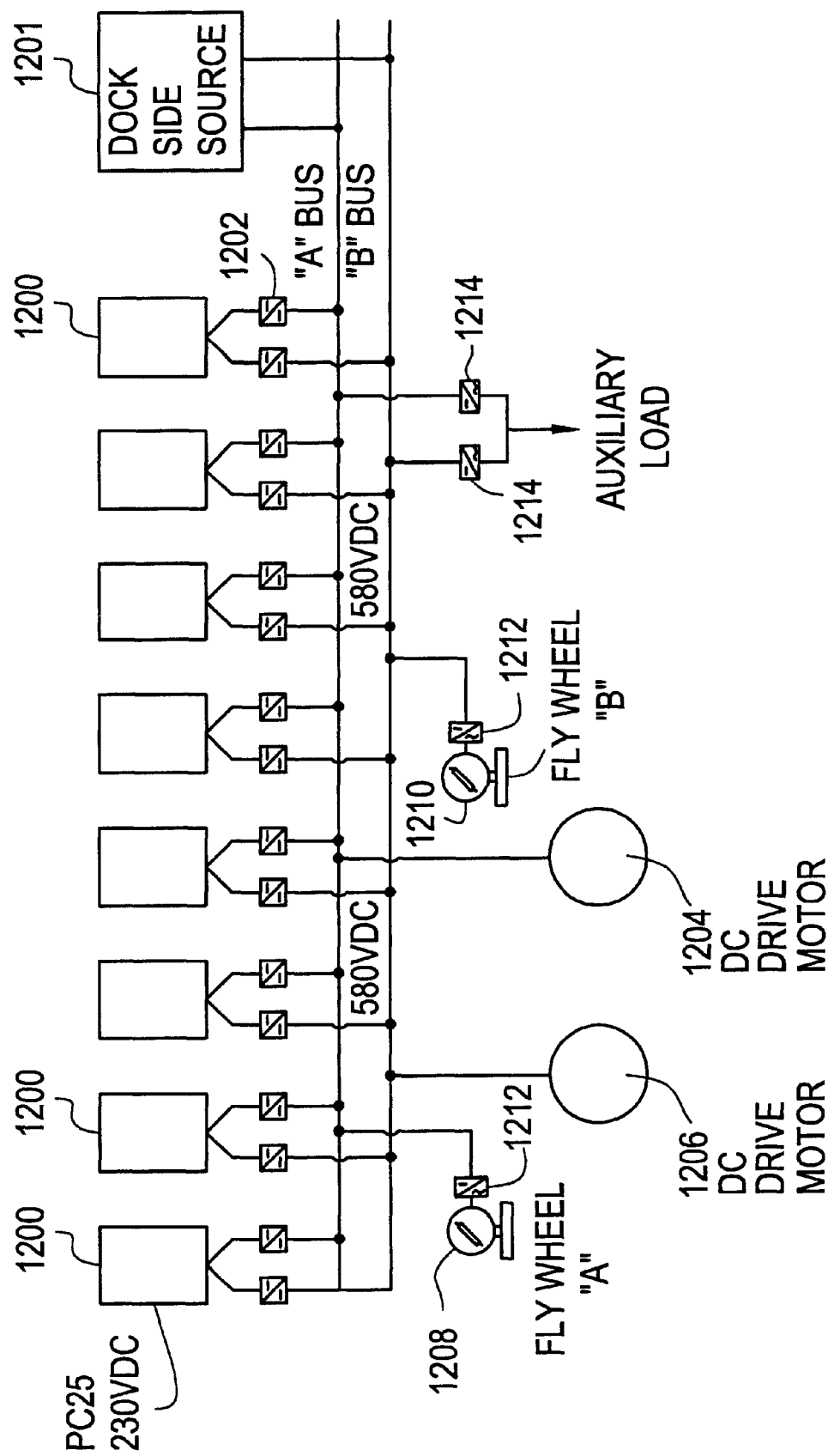
FIG. 15 is a block diagram of a power system in another embodiment of the invention.

FIG. 15 depicts a power system in another embodiment of the invention. The embodiment shown in FIG. 15 is suited for providing power to a drive mechanism in a transportation device such as a boat, automobile, bus, etc. As shown in FIG. 15, the system includes a number of power sources 1200 which may be fuel cells such as the PC25 brand fuel cell from ONSI Incorporated. The power sources 1200 power an A bus and a B bus through DC-DC converters 1202 (e.g., choppers). It is understood that a single DC bus may be used instead of dual DC buses. A single DC bus would reduce cost and availability. A first drive mechanism 1204 is coupled to the A bus and a second drive mechanism 1206 is coupled to the B bus. The drive mechanisms shown in FIG. 15 are DC motors, but the invention is not limited to DC motors. The DC motors 1204 and 1206 impart movement to the transportation device such as a boat, automobile, etc. Rotary devices 1208 and 1210 are also coupled to the A bus and B bus, respectively through AC-DC converters 1212. As shown in FIG. 15, the rotary devices are flywheels. Auxiliary loads may be powered through DC-AC converters 1214 if power is available on either the A bus or B bus. Each power source 1200 powers both the A bus and B bus thereby improving reliability in the event of power source failure.

In vehicular applications, power source 1200 may be an on-board engine instead of a fuel cell. For example, in marine applications, the DC buses may be powered by a diesel generator. Given the desire to reduce emissions, when a boat is docked, it would be preferable to power the auxiliary loads without running the fuel-based engine having high emissions. Using the DC bus power system, a dockside power supply 1201 can power the DC bus 0 when the boat is docked. The dockside power supply may be a utility fed through an AC/DC converter, a fuel cell, etc. While at dock, the boat engine can be shut off and the auxiliary loads (e.g., condensers for refrigeration) power by the dockside power source through the DC bus.

Figure 16:
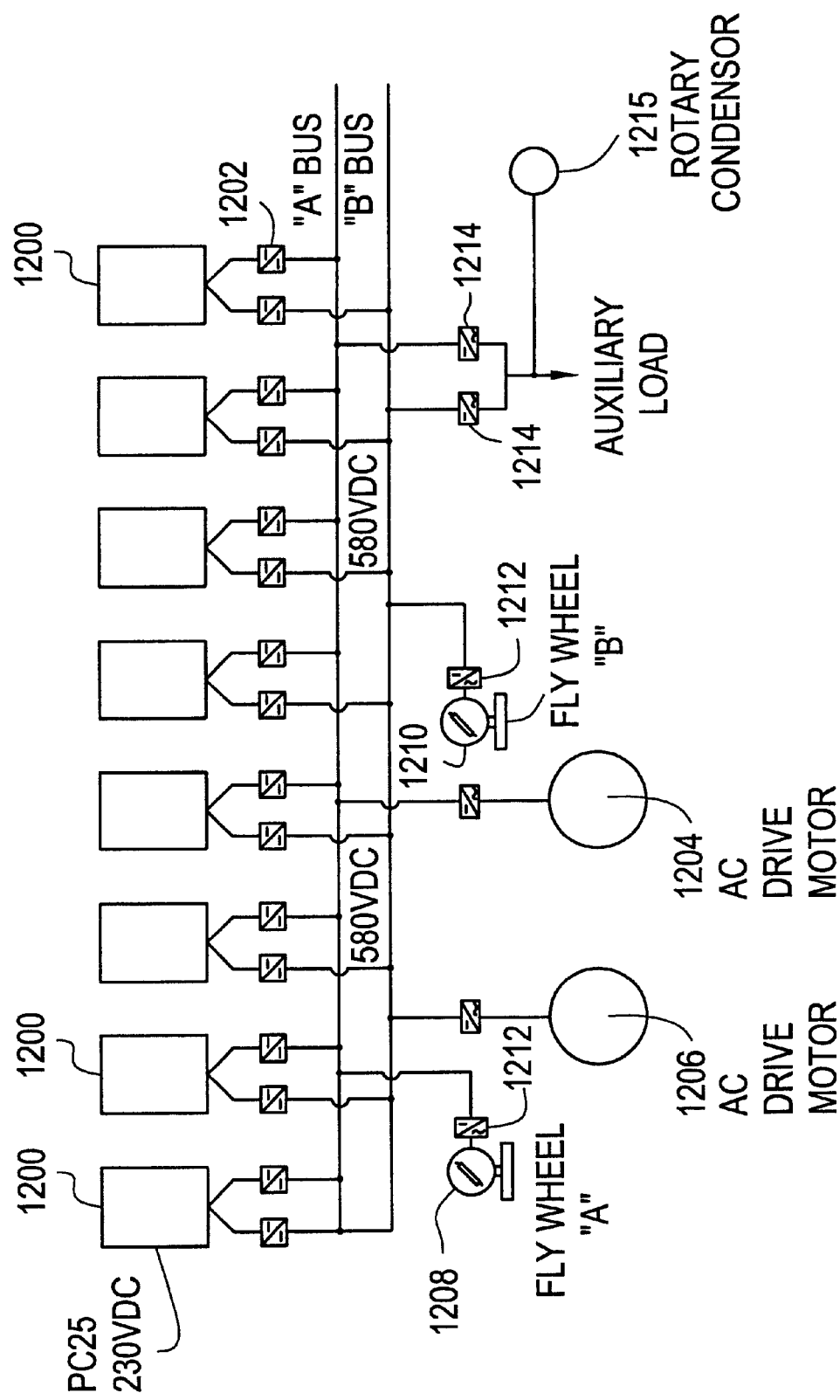
FIG. 16 is a block diagram of a power system in another embodiment of the invention.
Figure 17A:
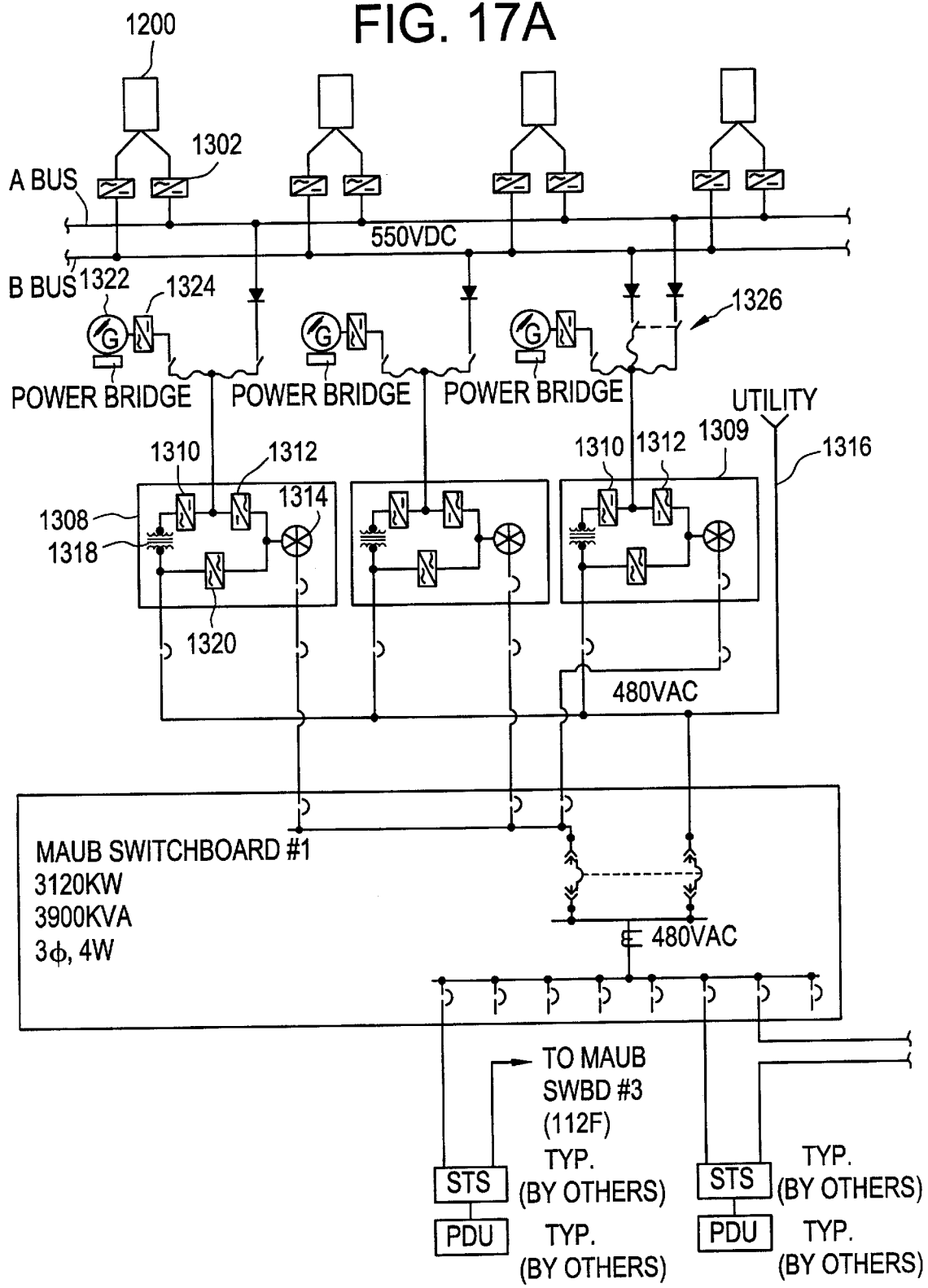
Figure 17C:
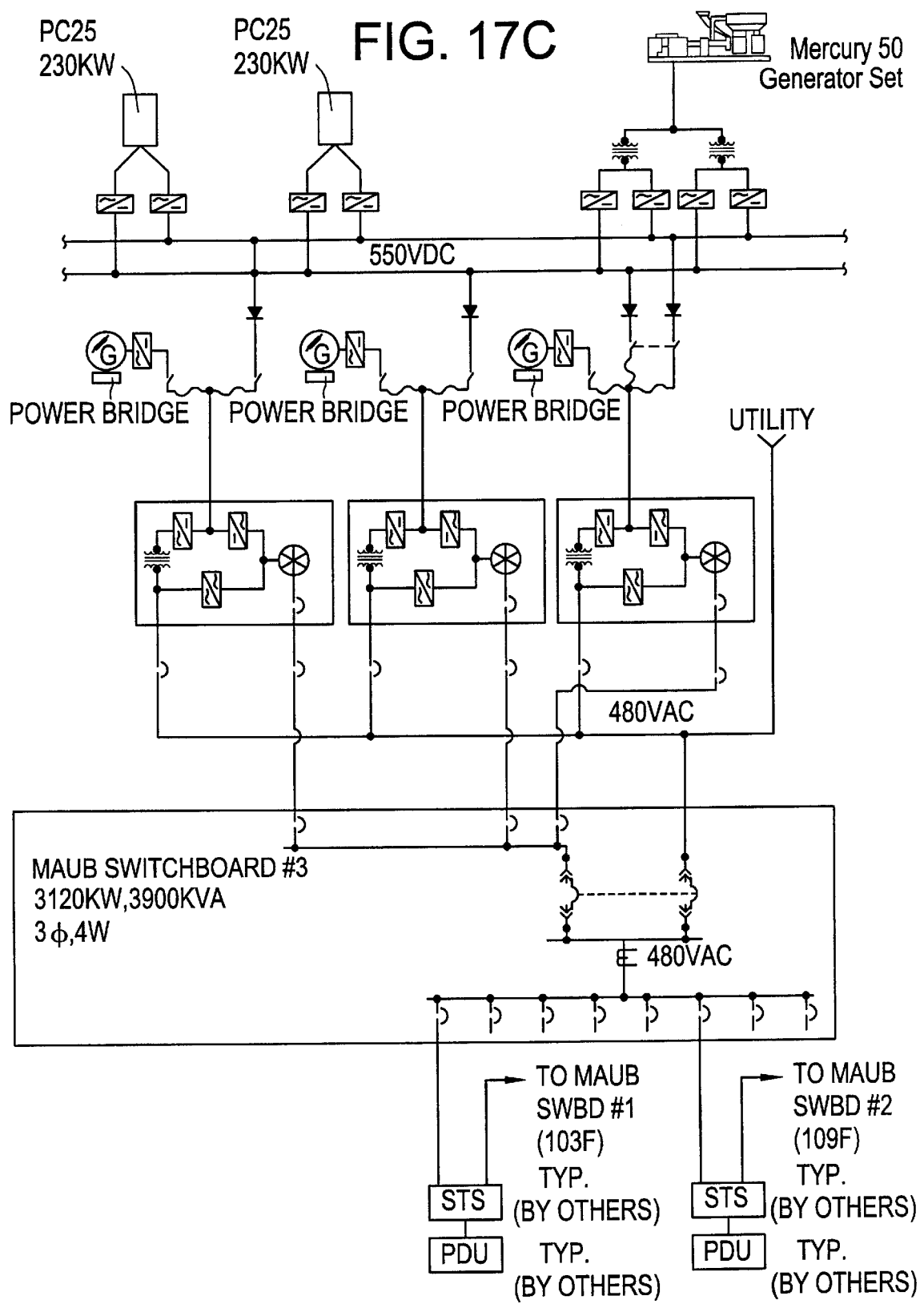
Figure 17D:
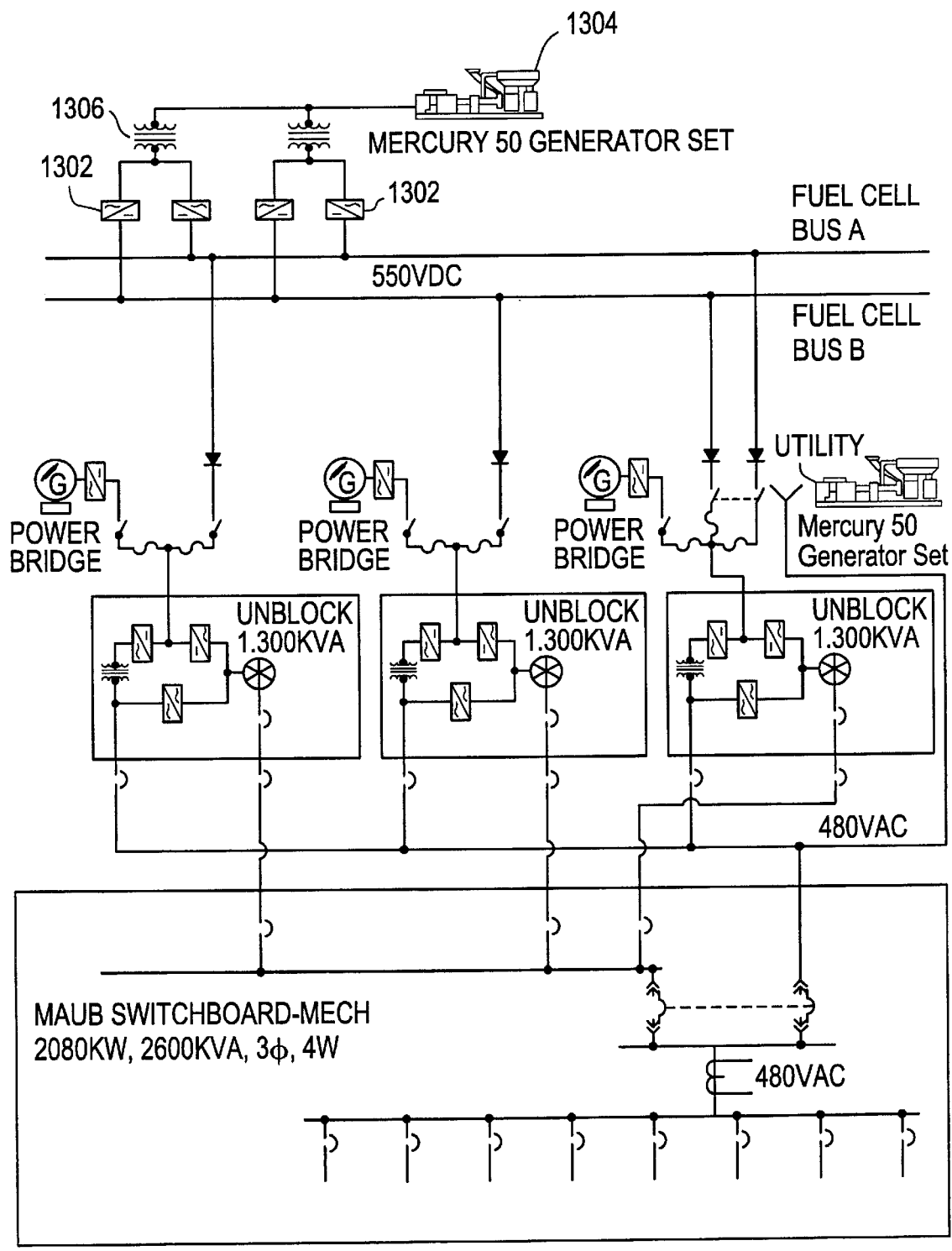

FIG. 16 depicts a power system in another embodiment of the invention. The system of FIG. 16 is similar to that in FIG. 15. In FIG. 16, however, a rotary device 1216 (e.g., a synchronous condenser) is included on the transmission path to the auxiliary loads to regulate power and perform other functions as known in the art. It is understood that a single DC bus may be used instead of dual DC buses. A single DC bus would reduce cost and availability.

FIGS. 17A–17D depict a power system in another embodiment of the invention. The power system includes two DC buses shown as the A bus and B bus. It is understood that a single DC bus may be used instead of dual DC buses. A single DC bus would reduce cost and availability. As shown in FIGS. 17A–17D, the system includes a number of power sources 1200 which may be fuel cells such as the PC25 brand fuel cell from ONSI Incorporated. The power sources 1200 may generate AC power which is converted to DC through AC/DC converters 1302 coupled to the DC buses. Additional power sources in the form of gas turbines 1304 are coupled to the DC buses through a transformer 1306. The output of transformer 1306 is converted to DC through AC/DC converters 1302. Other power sources such as micro-turbines, turbines, reciprocating engines, etc. may be used and coupled to the DC buses.

The DC buses are coupled to rotary devices 1308. In an exemplary embodiment, the rotary device 1308 is a Uniblock UPS available from Piller. The DC bus is connected to DC side of a rectifier 1310,and inverter 1312. In this way, the DC bus drives a motor generator 1314 in the rotary device. A utility grid 1316 is also connected to the motor generator 1314 through a transformer 1318 and the rectifier 1310/inverter 1312. A switch 1320 allows the utility 1316 to drive motor generator 1314 directly without passing through the rectifier 1310/inverter 1312. Another rotary power source 1322 (e.g., a flywheel) may be connected through an AC/DC converter 1324 to the DC input of inverter 1312. This allows the flywheel 1322 to compensate for step loads, source switching, etc. as described above. The system also includes a rotary device 1309 having the DC side of rectifier 1310 and inverter 1312 coupled to both the A bus and B bus through a double pole switch 1326. The rotary device may be programmed to actuate switches 1320 and 1326 or this operation may be provided by a separate controller. The output of the motor generators 1314 are paralleled together as described above in alternate embodiments. These power sources feed a switchboard for powering critical loads as described in alternate embodiment herein. The system of FIGS. 17A–17D provides redundant power system components thereby eliminating any single point of failure for the entire system.

Figure 18A:
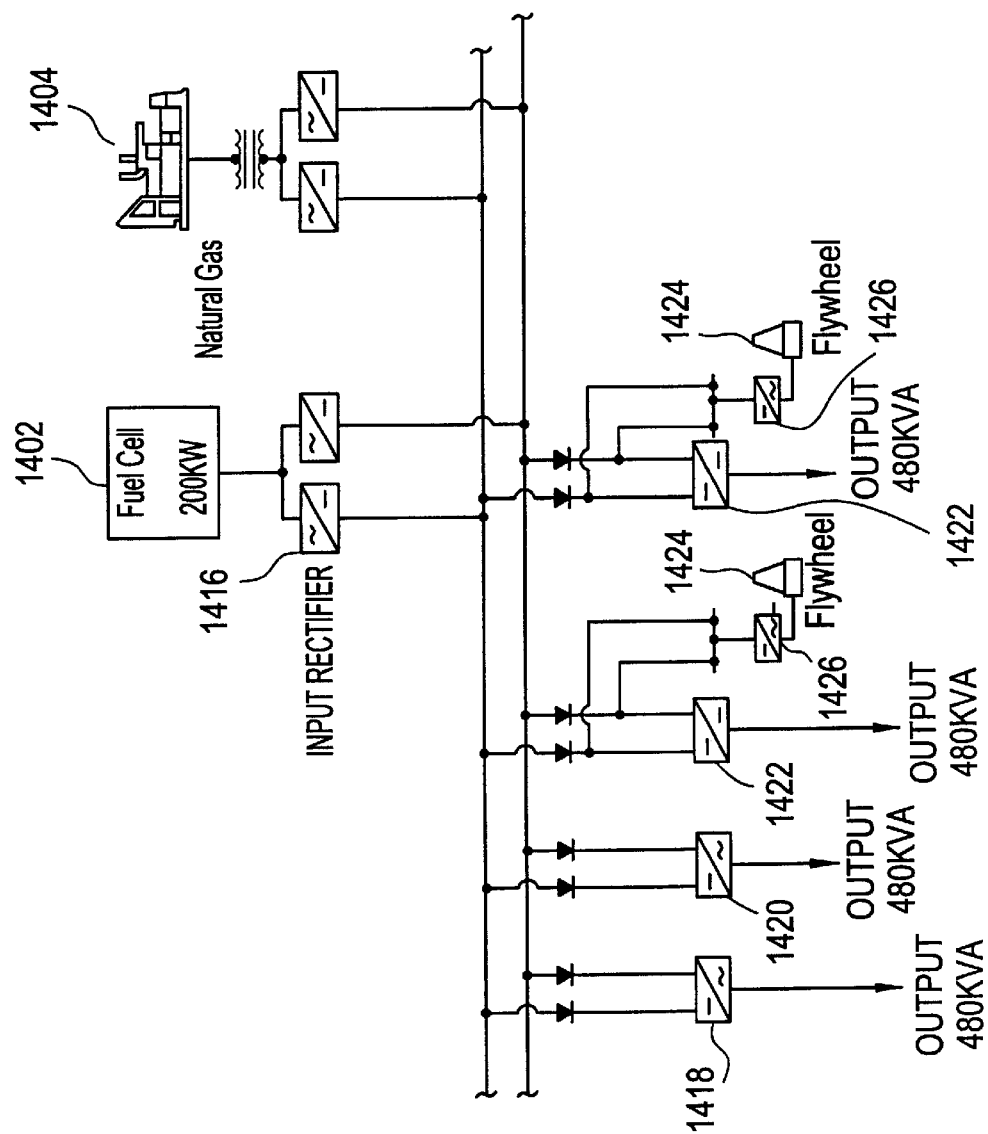
Figure 18B:
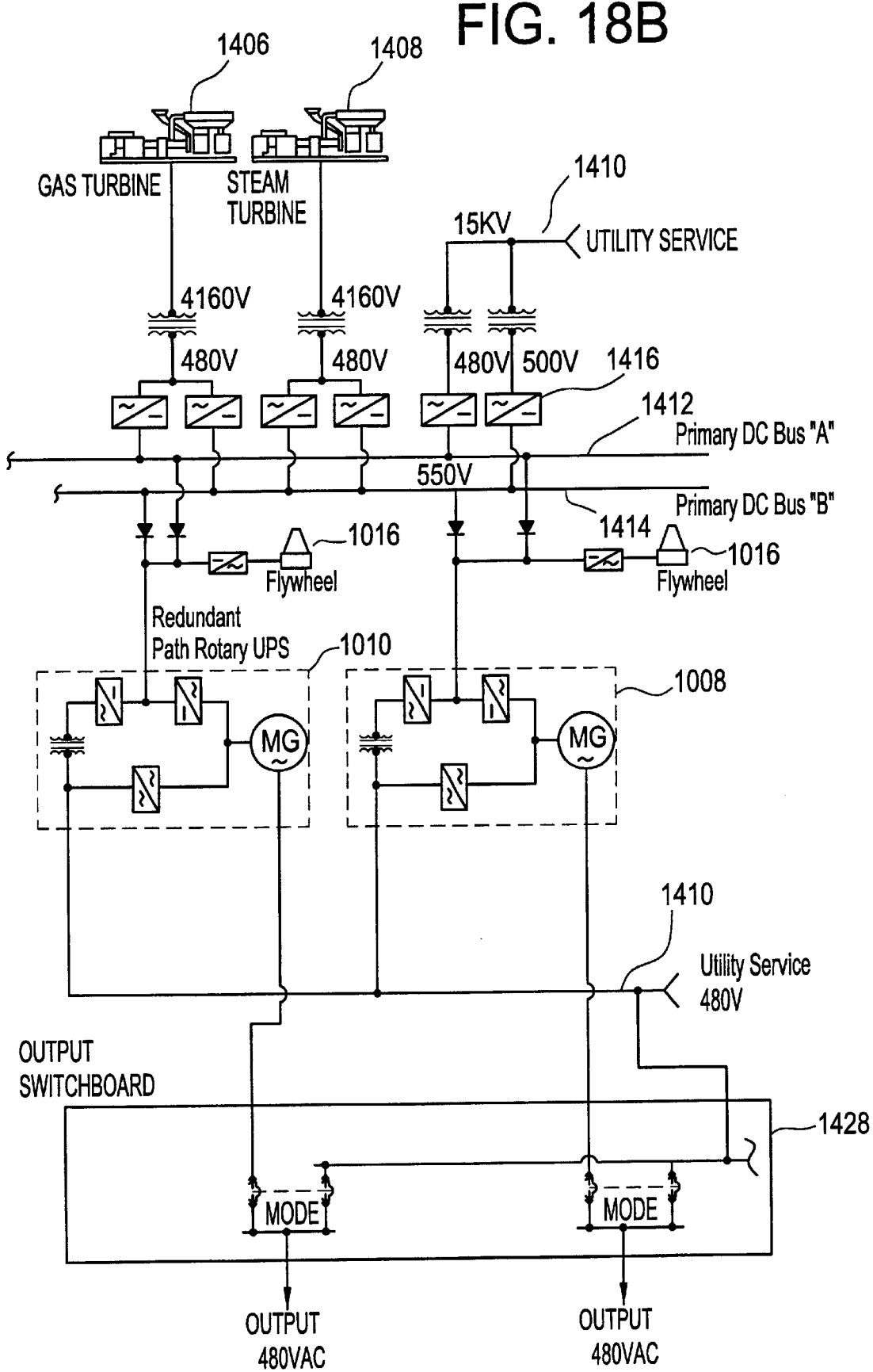

FIGS. 18A, 18B–22 depict alternate embodiments of the invention. FIGS. 18A–18B depict a power system including a number of power sources including fuel cell 1402, natural gas generator 1404, gas turbine 1406, steam turbine 1408 and utility 1410. It is understood that other power sources, in any quantity, may be used beyond those shown in FIGS. 18A–18B. The power sources all provide power to a first DC bus 1412 and a second DC bus 1414 through AC/DC converters 1416. It is understood that a power source generating DC power may be coupled directly to the DC buses or coupled to the DC buses through a DC/DC converter. Voltage on the DC buses can range depending on the application. For example the voltage may range from 520 V for a commercial building to 20,000 V for an industrial site.

A variety of loads are powered from the DC buses 1412 and 1414. One load requiring 480 VAC is supplied through DC/DC converter 1418 having an input coupled to both the first DC bus 1412 and the second DC bus 1414. A load requiring 13.8 KVAC is supplied through DC/DC converter 1420 having an input coupled to both the first DC bus 1412 and the second DC bus 1414. Loads requiring –48 V DC (such as telecommunications equipment) are supplied through DC/DC converters 1422 having inputs coupled to both the first DC bus 1412 and the second DC bus 1414. An auxiliary power supply such as rotary flywheel 1424 may power the input of DC/DC converters 1422 through AC/DC converter 1426 if the voltage on the DC buses 1412 and 1414 drops below some threshold as detected by the rotary device or a controller. Rotary devices 1008 and 1010 are coupled to the DC buses 1412 and 1414 in a manner similar to that described above with reference to FIG. 8. Auxiliary power sources 1016 such as rotary flywheels 1016 provide power to the rotary devices 1008 and 1010 in the event the DC buses voltage drops as described above with reference to FIG. 8. Circuit elements (e.g., diodes) prevent the flywheels 1424 and 1016 from providing power to the DC buses 1412 and 1414. Rotary devices 1008 and 1010 power a critical load through switchboard 1428 similar to the system described above with reference to FIG. 8.

Figure 19:
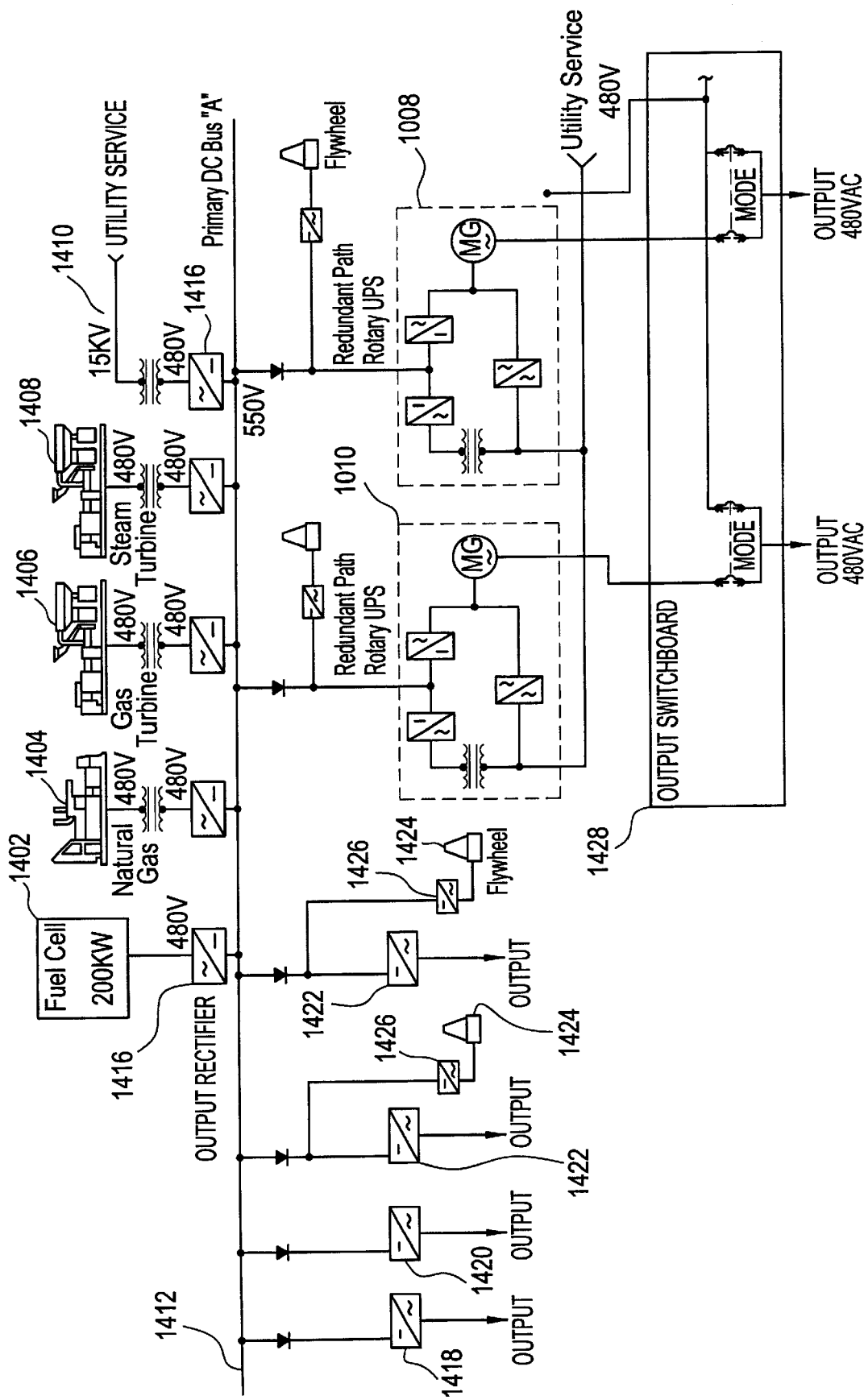

FIG. 19 depicts an alternate system similar to FIGS. 18A–18B but which features a single DC bus 1412 instead of dual DC buses. Using a single DC bus will reduce cost of the system but also reduce availability.

Figure 20:
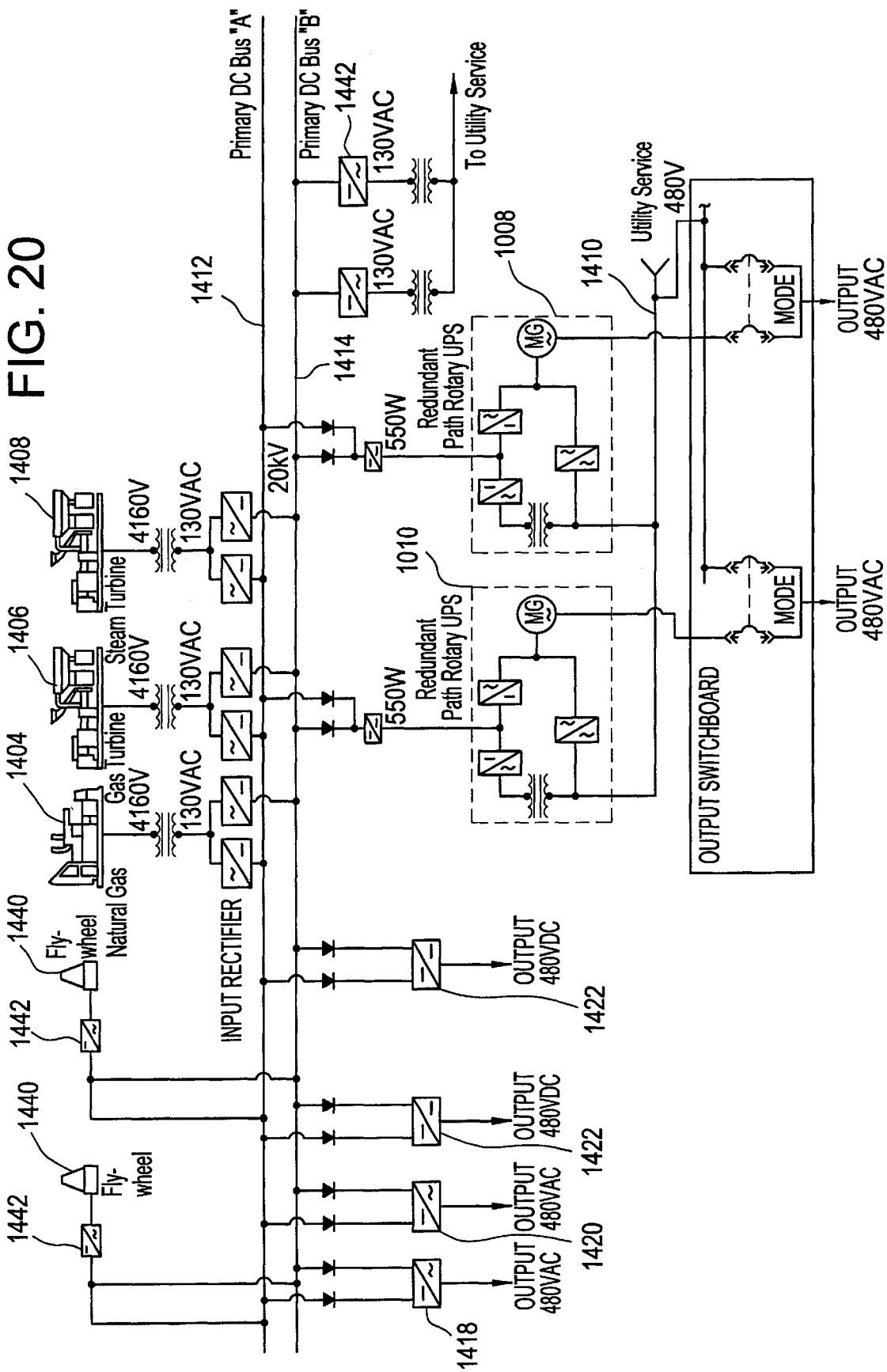

FIG. 20 depicts an alternate embodiment of the invention. In FIG. 20, auxiliary power sources such as rotary flywheels 1440 are used to power each DC bus 1412 and 1414 through AC/DC converters 1442. Thus, instead of coupling the flywheels to the inputs of the rotary devices 1008, 1010 or solid state devices 1418, 1420 and 1422, the flywheels are coupled directly to the DC buses. If the voltage on either DC bus falls below a threshold, the flywheels are activated to provide additional power. The detection may be performed by the rotary devices or a separate controller.

FIG. 20 also depicts a power path for the DC buses to provide power to the utility grid through DC/AC converters 1442. Excess power on the DC buses may be supplied back to the utility grid and the owner of the DC buses compensated for providing such power. Such arrangements are currently used by groups such as the New England Power Pool (NEEPOOL).

Figure 21:
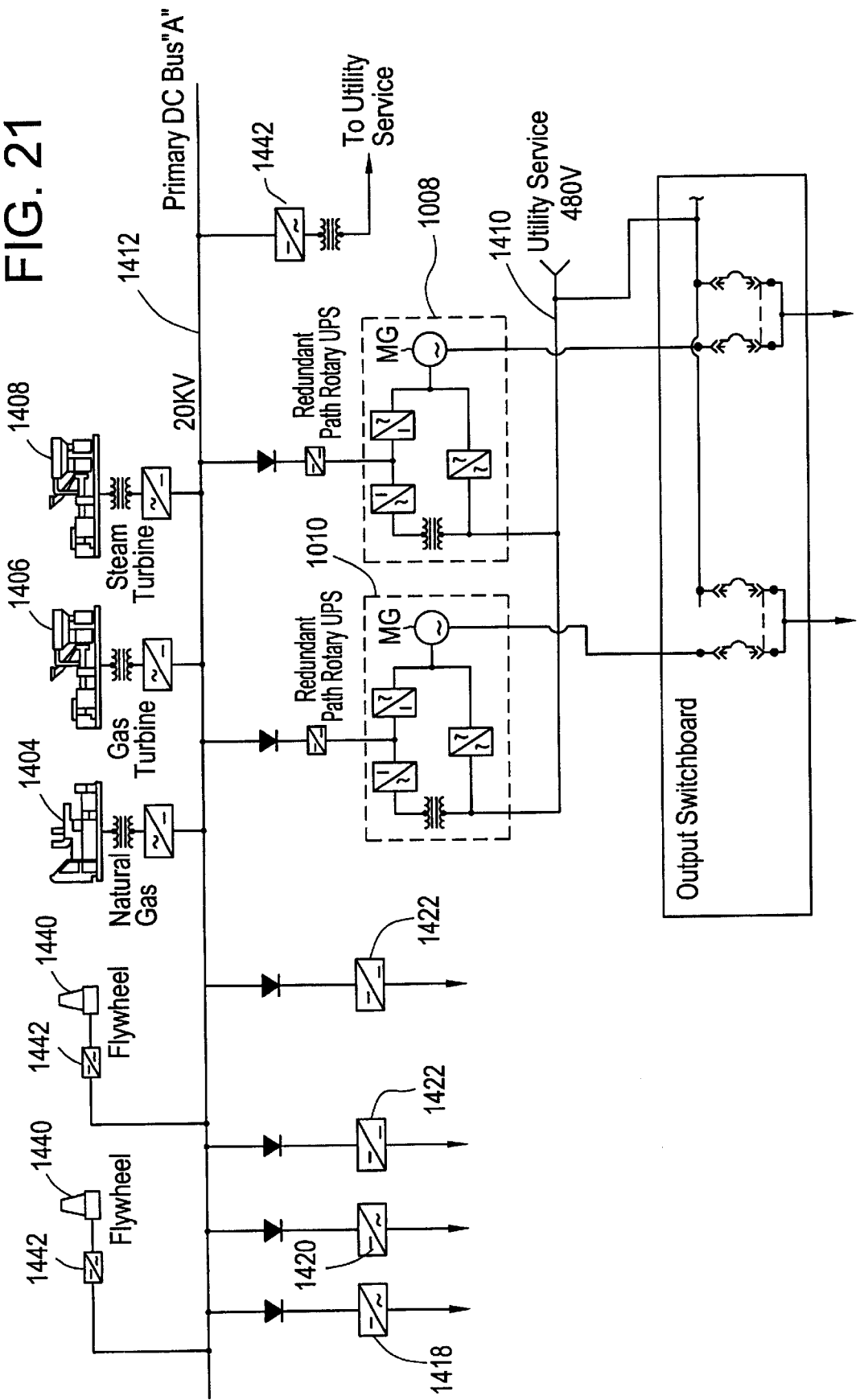

FIG. 21 depicts an alternate system similar to FIG. 20 but which features a single DC bus 1412 instead of dual DC buses. Using a single DC bus will reduce cost of the system but also reduce availability.

Figure 22:
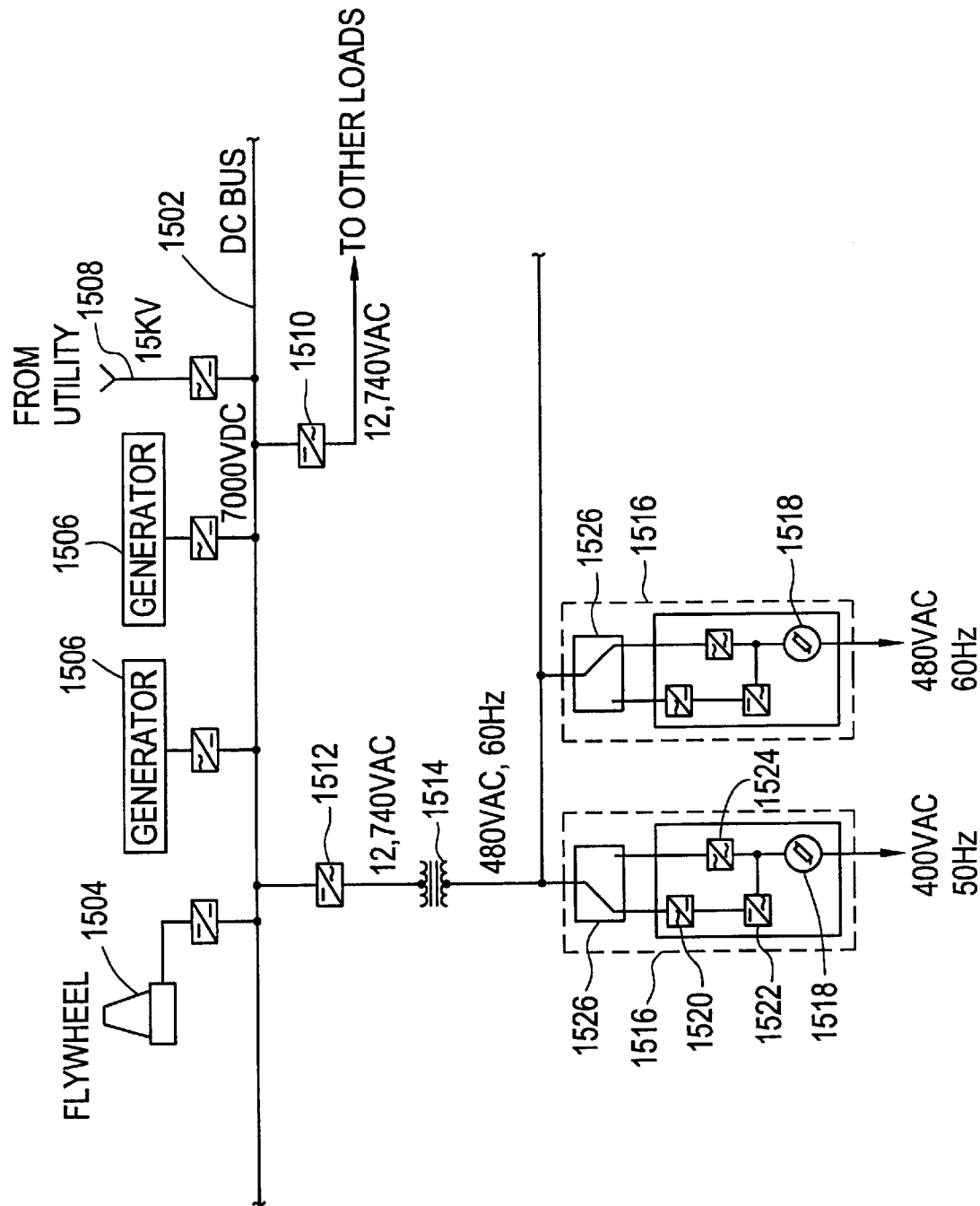

FIG. 22 depicts a power system in an alternate embodiment of the invention. The system includes a DC bus 1502 powered by a variety of power sources such as flywheel 1504, generators 1506, utility grid 1508, etc. It is understood that other power sources may be coupled to the DC bus 1502. From the DC bus 1502, other loads may be powered through a DC/AC converter 1510. Also coupled to the DC bus 1502 is a DC/AC converter 1512 which is coupled to a step down transformer 1514 to reduce the voltage. In the embodiment shown in FIG. 22, the voltage is reduced from 12,740 VAC to 480 VAC, 60 Hz. The output of transformer 1514 is provided to rotary device 1516. The rotary devices 1516 include a motor-generator 1518 which is driven by one of two power paths. A first power path includes a rectifier 1520 and inverter 1522. The other power path includes an AC/AC converter 1524. A transfer switch 1526 controls which power path drives the motor-generator 1518. Depending on the power path selected, the output of the rotary device 1516 can be either 400 VAC, 50 Hz if the first power path is used and 480 VAC, 60 Hz if the second power path is used. This embodiment is useful for facilities having equipment requiring different power specifications.

As described above, a variety of power conditioning devices may be used to transfer power from the DC bus to the load. Rotary devices, such as a motor-generator, may be coupled to the DC bus to provide high reliability power to critical loads. Alternatively, solid state devices such as DC/AC converters or DC/DC converters may be coupled to the DC bus to provide power to loads requiring less reliable power. Additional power sources can be easily added to the DC bus given the simplicity in coupling DC sources in parallel. The ability to add additional power sources to the DC bus and couple the DC bus to a variety of types of loads provides a flexible power system that can adapt to changing power requirements.

As described above, the power sources described herein are not limited to fuel cells but may also include microturbines, turbines, reciprocating engines and other types of power sources, and combinations of different types of power sources.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A power system comprising:
 a first power source generating DC power;
 a second power source generating DC power, said second power source independent or said first power source;
 a first DC bus coupled to said first power source and said second power source;
 a second DC bus coupled to said first power source and said second power source;
 a power conditioning device coupled to at least one of said first DC bus and said second DC bus;
 a load receiving power from said power conditioning device.

2. The power system of claim 1 wherein said power conditioning device is a rotary device.

3. The power system of claim 2 wherein said rotary device includes a motor-generator.

4. The power system of claim 3 wherein said rotary device includes a first power path for driving said motor-generator, said first DC bus and said second DC bus being connected to said first power path.

5. The power system of claim 4 wherein said first power path includes a rectifier and an inverter, said first DC bus and said second DC bus being connected to a junction between said rectifier and said inverter.

6. The power system of claim 4 wherein said rotary device includes a second power path for driving said motor-generator, a third power source being coupled to said second power path.

7. The power system on claim 6 wherein said third power source is a utility.

8. The power system of claim 1 wherein said power conditioning device is a solid state device.

9. The power system of claim 8 wherein said solid state device is a DC/DC converter.

10. The power system of claim 8 wherein said solid state device is a DC/AC converter.

11. The power system of claim 1 further comprising an auxiliary power source connected in parallel with said first DC bus and said second DC bus.

12. The power system of claim 11 wherein said auxiliary power source is connected directly to an input of said power conditioning device and a Circuit element prevents power flow from said auxiliary power source to said first DC bus and said second DC bus.

13. The power system of claim 12 wherein said circuit element is a diode.

14. The power system of claim 1 further comprising a DC/AC converter having an input coupled to said first DC bus and said second DC bus and an output coupled to a utility.

15. The power system of claim 1 further comprising an AC/DC converter coupling said first power source to said first DC bus.

16. The power system of claim 1 further comprising a DC/DC converter coupling said first power source to said first DC bus.

17. A power system comprising:
 a first power source generating DC power,
 a second power source generating DC power, said second power source independent of said first power source;
 a first DC bus coupled to said first power source and said second power source;
 a power conditioning device coupled to said first DC bus; and,
 a load receiving power from said power conditioning device.

18. The power system of claim 17 wherein said power conditioning device is a rotary device.

19. The power system of claim 18 wherein said rotary device includes a motor-generator.

20. The power system of claim 19 wherein said rotary device includes a first power path for driving said motor-generator, said first DC bus being connected to said first power path.

21. The power system or claim 20 wherein said first power path includes a rectifier and an inverter, said first DC bus being connected to a junction between said rectifier and said inverter.

22. The power system of claim 20 wherein said rotary device includes a second power path for driving said motor-generator, a third power source being coupled to said second power path.

23. The power system of claim 22 wherein said third power source is a utility.

24. The power system of claim 17 wherein said power conditioning device is a solid state device.

25. The power system of claim 24 wherein said solid state device is a DC/DC converter.

26. The power system of claim 24 wherein said solid state device is a DC/AC converter.

27. The power system of claim 17 further comprising an auxiliary power source connected in parallel with said first DC bus.

28. The power system of claim 27 wherein said auxiliary power source is connected directly to an input of said power conditioning device and a circuit element prevents power flow from said auxiliary power source to said first DC bus.

29. The power system of claim 28 wherein said circuit element is a diode.

30. The power system of claim 17 further comprising a DC/AC converter having an input coupled to said first DC bus and an output coupled to a utility.

31. The power system of claim 17 further comprising an AC/DC converter coupling said first power source to said first DC bus.

32. The power system of claim 17 further comprising a DC/DC converter coupling said first power source to said first DC bus.

33. A marine vehicle having a power system comprising:
 a first power source;
 a first DC bus coupled to said first power source;
 a DC drive motor coupled to said DC bus for imparting motion to said vehicle;
 wherein said DC bus is connectable to a dockside power source eliminating the need to operate said first power source.

34. The marine vehicle of claim 33 wherein said first power source is a diesel engine.

35. The power system of claim 1 wherein said first power source includes an output device outputting the DC power.

36. The power system of claim 1 wherein said second power source includes an output device outputting the DC power.

* * * * *